(12) United States Patent
Ferrucci et al.

(10) Patent No.: US 12,731,158 B2
(45) Date of Patent: Sep. 8, 2026

(54) COLLABORATIVE USER SUPPORT PORTAL

(71) Applicant: Elemental Cognition Inc., Wilton, NY (US)

(72) Inventors: David A. Ferrucci, Wilton, CT (US); Gregory H. Burnham, Brooklyn, NY (US); Aditya A. Kalyanpur, Fort Lee, NJ (US); David Nachman, New York, NY (US)

(73) Assignee: Bridgewater Associates EC IP, LLC, Westport, CT (US)

( * ) Notice: Subject to any disclaimer, the term of this patent is extended or adjusted under 35 U.S.C. 154(b) by 914 days.

(21) Appl. No.: 17/674,760

(22) Filed: Feb. 17, 2022

(65) Prior Publication Data

US 2022/0261817 A1 Aug. 18, 2022

Related U.S. Application Data

(60) Provisional application No. 63/150,849, filed on Feb. 18, 2021.

(51) Int. Cl.

| | |
|---|---|
| ***G06Q 30/016*** | (2023.01) |
| ***G06F 40/20*** | (2020.01) |
| ***G06F 40/35*** | (2020.01) |
| ***G06N 20/00*** | (2019.01) |

(52) U.S. Cl.

CPC ........... *G06Q 30/016* (2013.01); *G06F 40/20* (2020.01); *G06F 40/35* (2020.01); *G06N 20/00* (2019.01)

(58) Field of Classification Search

CPC ...... G06Q 30/00; G06Q 30/016; G06N 20/00; G06F 40/00; G06F 40/20; G06F 40/35

See application file for complete search history.

(56) References Cited

U.S. PATENT DOCUMENTS

| | | | | |
|---|---|---|---|---|
| 2011/0197122 A1* | 8/2011 | Chan | G06F 16/958 | 715/234 |
| 2014/0310595 A1* | 10/2014 | Acharya | G06F 3/011 | 715/706 |
| 2015/0019241 A1* | 1/2015 | Bennett | G16H 50/20 | 705/2 |

(Continued)

OTHER PUBLICATIONS

Su, Y.Y. and Flinn, J., 2009, June. Automatically Generating Predicates and Solutions for Configuration Troubleshooting. In USENIX Annual Technical Conference. (Year: 2009).*

*Primary Examiner* — Sean E Serraguard

(74) *Attorney, Agent, or Firm* — Lee & Hayes, P.C.

(57) ABSTRACT

A collaborative user support system may include support components and a user portal to interact with a user and generate solutions to user problems. The support components may include a natural language understanding (NLU) engine, a reasoning engine, a semantic search engine, a multimodal dialog engine, and an active learning engine. The user portal may receive input dialog and the NLU engine may translate the dialog into machine language. The reasoning engine may determine whether the dialog includes a problem and call the semantic search engine to identify a potential solution. The multimodal dialog engine may determine a visual representation of a problem and/or solution. The active learning engine may receive user feedback on generated solutions for continuous improvements to the system.

20 Claims, 14 Drawing Sheets

(56) References Cited

U.S. PATENT DOCUMENTS

| | | | | |
|---|---|---|---|---|
| 2018/0121808 | A1* | 5/2018 | Ramakrishna | H04L 51/02 |
| 2019/0347117 | A1* | 11/2019 | Vaughn | G06F 16/5866 |
| 2019/0377728 | A1* | 12/2019 | Cai | G06F 16/248 |
| 2020/0012670 | A1* | 1/2020 | Heckmann | G06N 5/02 |
| 2020/0110647 | A1* | 4/2020 | Souche | G06F 11/0709 |
| 2020/0234826 | A1* | 7/2020 | Said | G16H 10/20 |
| 2020/0294497 | A1* | 9/2020 | Kirazci | G10L 13/027 |
| 2020/0387391 | A1* | 12/2020 | Fitzgerald | G06V 20/20 |
| 2021/0074073 | A1* | 3/2021 | Mittleman | G06T 19/006 |
| 2021/0248618 | A1* | 8/2021 | Ionescu | G06Q 30/016 |

* cited by examiner

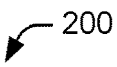

PROCESSOR(S) 202

COMPUTER-READABLE MEDIA 204

COLLABORATIVE USER SUPPORT SYSTEM 206

USER PORTAL 208

SEMANTIC SEARCH ENGINE 210

NATURAL LANGUAGE UNDERSTANDING (NLU) ENGINE 212

SEMANTIC PARSER 214

MULTIMODAL DIALOG ENGINE 216

REASONING ENGINE 218

DOMAIN RULES COMPONENT 220

DYNAMIC RULES GENERATOR 222

ACTIVE LEARNING ENGINE 224

MODEL(S) 226

DATA STORE 228

(domain rules, inference rules, core theory, natural language data, rule templates)

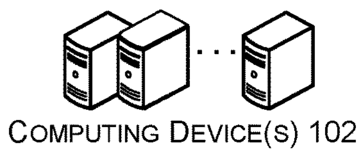

COMPUTING DEVICE(S) 102

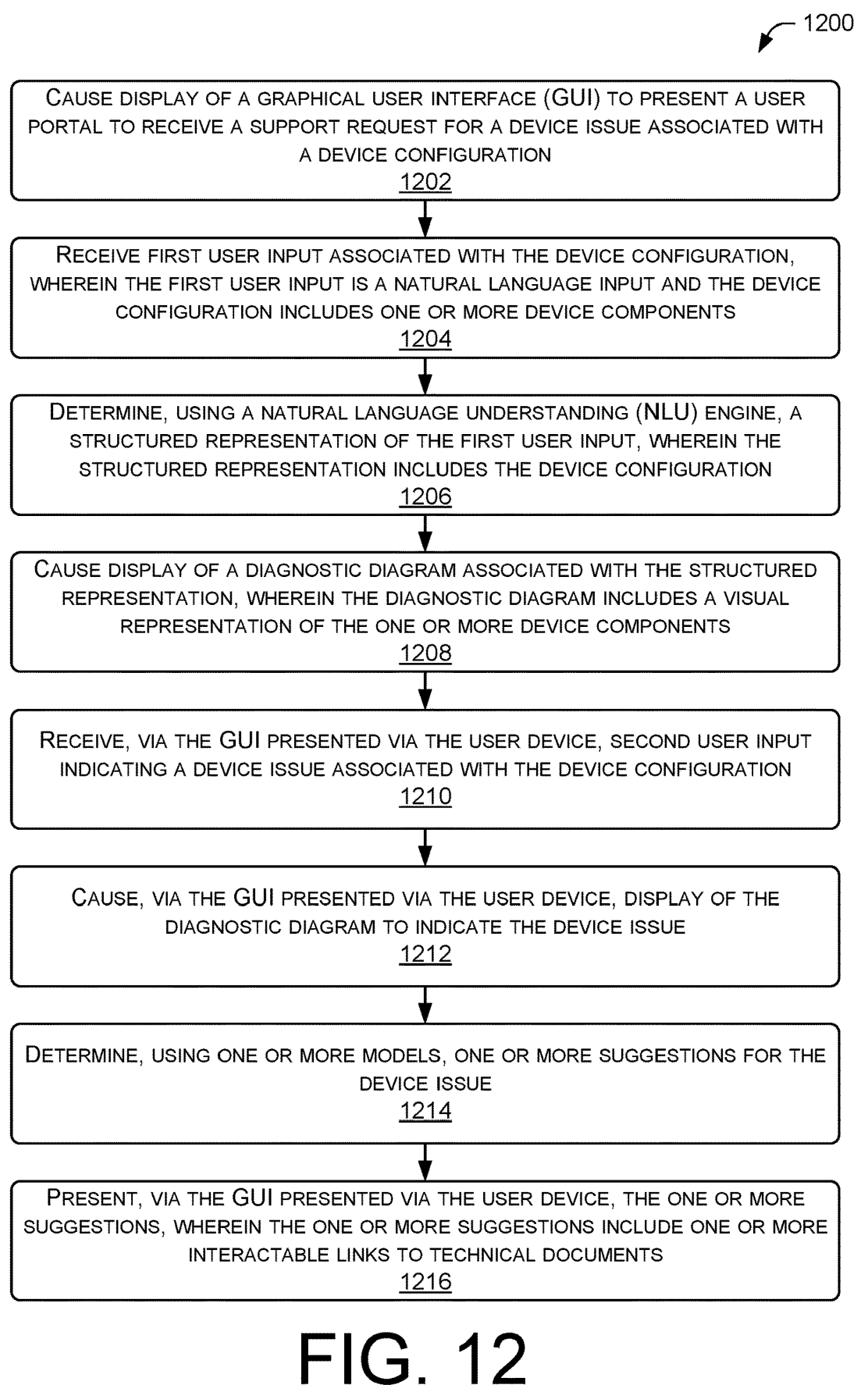

CAUSE DISPLAY OF A GRAPHICAL USER INTERFACE (GUI) TO PRESENT A USER PORTAL TO RECEIVE A SUPPORT REQUEST FOR A DEVICE ISSUE ASSOCIATED WITH A DEVICE CONFIGURATION
1202

RECEIVE FIRST USER INPUT ASSOCIATED WITH THE DEVICE CONFIGURATION, WHEREIN THE FIRST USER INPUT IS A NATURAL LANGUAGE INPUT AND THE DEVICE CONFIGURATION INCLUDES ONE OR MORE DEVICE COMPONENTS
1204

DETERMINE, USING A NATURAL LANGUAGE UNDERSTANDING (NLU) ENGINE, A STRUCTURED REPRESENTATION OF THE FIRST USER INPUT, WHEREIN THE STRUCTURED REPRESENTATION INCLUDES THE DEVICE CONFIGURATION
1206

CAUSE DISPLAY OF A DIAGNOSTIC DIAGRAM ASSOCIATED WITH THE STRUCTURED REPRESENTATION, WHEREIN THE DIAGNOSTIC DIAGRAM INCLUDES A VISUAL REPRESENTATION OF THE ONE OR MORE DEVICE COMPONENTS
1208

RECEIVE, VIA THE GUI PRESENTED VIA THE USER DEVICE, SECOND USER INPUT INDICATING A DEVICE ISSUE ASSOCIATED WITH THE DEVICE CONFIGURATION
1210

CAUSE, VIA THE GUI PRESENTED VIA THE USER DEVICE, DISPLAY OF THE DIAGNOSTIC DIAGRAM TO INDICATE THE DEVICE ISSUE
1212

DETERMINE, USING ONE OR MORE MODELS, ONE OR MORE SUGGESTIONS FOR THE DEVICE ISSUE
1214

PRESENT, VIA THE GUI PRESENTED VIA THE USER DEVICE, THE ONE OR MORE SUGGESTIONS, WHEREIN THE ONE OR MORE SUGGESTIONS INCLUDE ONE OR MORE INTERACTABLE LINKS TO TECHNICAL DOCUMENTS
1216

FIG. 12

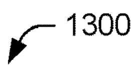

CAUSE DISPLAY OF A GRAPHICAL USER INTERFACE (GUI) TO PRESENT A USER PORTAL TO RECEIVE SUPPORT REQUEST FOR AN ISSUE
1302

RECEIVE, VIA THE GUI PRESENTED VIA A USER DEVICE, USER INPUT FOR THE SUPPORT REQUEST INCLUDING AN ISSUE DESCRIPTION
1304

DETERMINE, USING A NATURAL LANGUAGE UNDERSTANDING (NLU) ENGINE ON THE USER INPUT, A STRUCTURED REPRESENTATION OF THE ISSUE DESCRIPTION
1306

CAUSE, VIA THE GUI PRESENTED VIA THE USER DEVICE, DISPLAY OF THE STRUCTURED REPRESENTATION THAT INCLUDES A VISUAL REPRESENTATION OF THE ISSUE DESCRIPTION
1308

DETERMINE, USING ONE OR MORE MODELS, ONE OR MORE SUGGESTIONS BASED ON THE ISSUE DESCRIPTION
1310

PRESENT, VIA THE GUI PRESENTED VIA THE USER DEVICE, THE ONE OR MORE SUGGESTIONS
1312

FIG. 13

COLLABORATIVE USER SUPPORT PORTAL

PRIORITY

The present application claims the benefit of U.S. Provisional Patent Application No. 63/150,849, filed on Feb. 18, 2021, which is incorporated herein by reference in its entirety as if fully set forth herein.

BACKGROUND

In a traditional technical support setting, a customer may encounter an issue when trying to connect a new gaming console to their home entertainment system. The customer may attempt a few troubleshooting steps before contacting a customer support center. The customer may interact with a technical support agent on the phone or via a live text chat to attempt to diagnose and resolve the problem. Typically, the dialog starts with the customer describing, at a high-level, the issue they are facing and then describing the system configuration with sufficient detail for the agent to be able to identify potential issues. This traditional support system presents several disadvantages.

For the customer, if the connection between the customer and the support agent gets cut off at any point, the customer may need to repeat all steps taken from the beginning. The customer may need to re-establish the connection with the support center a second time, wait in a queue for an available agent a second time, and redo every troubleshooting step all over again with a new agent. This includes having to repeat all of the previously presented background information a second time.

At the customer support center, a service agent may use a ticketing system to help assist customers with their problems. When the customer calls in, the service agent may receive customer data on a service ticket generated by the ticketing system, including some general information. The service agent may add, to the service ticket, specific issue information described by the customer and then interact with the customer to troubleshoot the issue. In some cases, the troubleshooting fails to lead to a solution, but the customer is unable to retain any recorded diagnostic steps already performed. The customer is unable to take the service ticket to another support center to continue receiving help based on where the diagnostic steps previously ended. In the event that the issue was resolved, the diagnosis, notes, and remedial actions that could be helpful in diagnosing future problems are lost to the customer.

Finally, the system configuration information, as specified by the customer, is not saved across dialog sessions. If the customer, with a complicated home entertainment system, later encounters different problems with the system, they will need to repeat specifying their system configuration from scratch.

More recently, automated technologies, such as chatbots, virtual agents, and virtual assistants, have been deployed to allow customers to self-serve their troubleshooting needs. However, while these technologies may assist with simple tasks (e.g., "report an outage" or "cancel my subscription"), they are unable to engage in complex problem-solving tasks that requires taking into account relevant information about a customer's individual goals and circumstances. Accordingly, the customer may attempt to try these systems but may quickly give up to seek out a human agent when the automated system fails to solve their problem.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 is a block diagram of an illustrative computing architecture of a collaborative user support system, as described herein.

FIG. 12 illustrates an example process for a user interface to receive a support request in electronics domain using the collaborative user support system, as discussed herein.

FIG. 13 illustrates an example process for a user interface to receive a support request using the collaborative user support system, as discussed herein.

DETAILED DESCRIPTION

Figure 1:
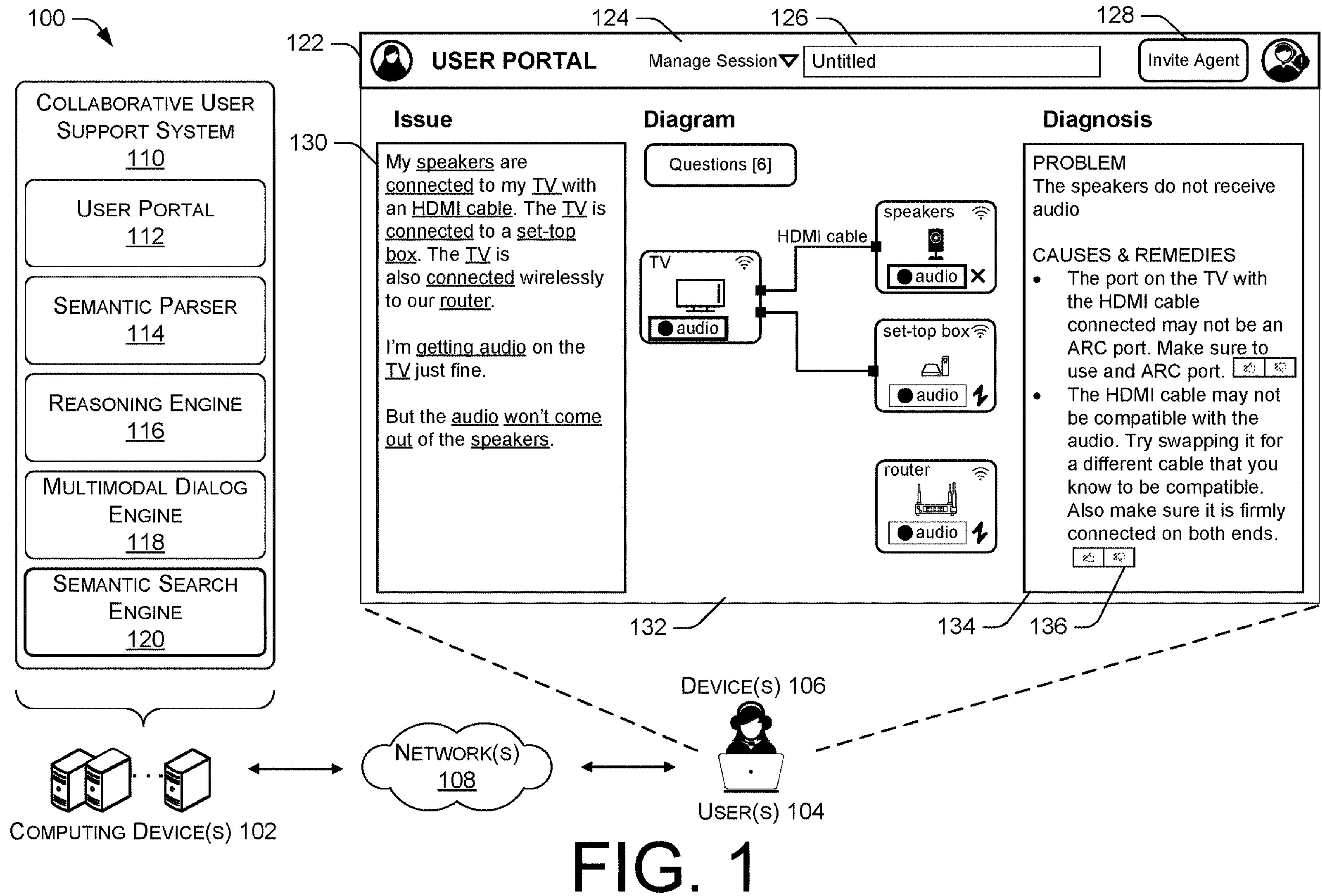
FIG. 1 illustrates an example system including a collaborative user support system that is configured with a user portal and domain models to receive support requests, render visual aids, and provide suggestions, as described herein.

This disclosure is directed, in part, to a collaborative user support system including a user portal and domain models to receive support requests, render visual aids, and provide suggestions. The system may configure the user portal to interact with a user and provide support for an input scenario. The user portal may present prompts for user input to collect data for the input scenario. In some examples, the system may generate a session model to represent the input scenario and/or collected data and determine whether the user input includes sufficient data to enable the system to understand the input scenario including a device configuration and a device issue associated with the user. The system may collect data using methods including: (1) leveraging natural language interactions with the user; (2) providing visual feedback, in direct response to user input, by continuously generating and updating graphical representations of any identified device components to validate and/or highlight gaps of the system understanding; and (3) generating questions and/or advice as needed to prompt user input for additional information to complete a session model. In response to completing the session model, the system may store suggested solutions marked with user feedback associated with the device issue to be used as training data.

In some examples, the collaborative user support system may configure components including natural language understanding (NLU), machine learning (ML), logical reasoning, and/or graphical user interface (GUI) technologies to assist the user to diagnose and find solutions for a support request. The system may configure domain models to provide artificial intelligence (AI) expertise for corresponding specific domain knowledge. For instance, the system may configure an electronic devices domain model to provide AI support for a gaming consoles. A domain model may be written in a formal knowledge representation language that captures a causal structure of the domain (e.g., how signals flow between network devices, etc.). The domain model may include concepts, relationships between the concepts, or causal laws associated with the domain.

In various examples, the collaborative user support system may configure domain models to provide the requisite expert domain knowledge needed to respond to a support request and provide suggestions to resolve the support issue. It is to be appreciated that although many examples described herein are in the context ("domain") of providing user support in the electronic devices domain, the present systems and the techniques discussed herein are not limited to this particular domain. The systems and the techniques can be used in connection with other domains and/or industries, including in the context of any industry where multiple human experts and/or AI experts may be engaged to help formulate, diagnose, and solve problems through extended interactions. For example, the other domains may include but are not limited to, healthcare/medical domain, e-commerce domain, financial domain, architectural domain, home improvement domain, hobbyist domain, teaching domain, legal domain, educational domain, and the like.

The system may include a user portal to interact with a user. The user portal may allow the user to create a user account associated with user data. The user portal may generate data structures ("models") to store session data and associate the session data with the user account and/or user data. The user portal may allow the user to define and persist a personalized set-up, model, or configuration for any topic/domain (e.g., a model for a configuration of a home entertainment system and/or a model of personal medical information). The user portal may allow the user to create, save, browse, open, and edit any stored model and/or update the model in response to changes in configuration. For instance, if the user replaced an old TV with a new 4 k TV, the user may change the model for the configuration of the home entertainment system.

In some examples, the system may allow a user account to be associated with multiple user data and/or multiple models. For instance, an example user account may be associated with multiple user data including medical records for the user and medical records for the children of the user. Additionally, the example user account may also be associated with multiple models including multiple device configurations for different rooms of a family home and/or for different properties.

The system allows a user associated with the user account to have control over their user data including past and present session models. The user portal allows the user to store, retrieve, and transmit their user data, and further allows the user to grant access any portion of the user data to a third party. In some examples, the user portal may enable a user to create a session model and to associate the session model as a main model for the user account. The main model may indicate an active problem/issue the user is currently having with their entertainment system or symptoms the patient has been experiencing.

In various examples, the user portal may receive user input describing a configuration and issues ("input scenario") as natural language input. The user portal may present a multimodal presentation of the configuration and user interface (UI) elements to prompt user input to edit and/or refine the configuration. In a non-limiting example, the multimodal presentation may include a visual mapping or visual layout of a network diagram, a medical timeline, or a structured text.

In some examples, the user portal may receive user input to invite a knowledge expert remotely into a model environment to engage in a live dialog session. The user portal may enable a collaborative discussion of the session model and/or the configuration, and a determination of any remedial actions. The session model may be updated with the new information acquired in the live dialog session and persisted over time including historical information.

In some examples, the system may configure a NLU engine including a semantic parser and a multimodal dialog engine. The semantic parser may receive natural language input and translate the input into machine-readable structured representations. As described herein, the system may use the multimodal dialog engine to communicate back to the user through diagrams and natural language generation (NLG). The diagrams may include visual representation of the structured representations. The diagrams may also provide a visual feedback to increase the confidence for the user that the system is correctly formulating the issue and also providing actionable information. The actionable information may include logically deduced diagnostic suggestions and/or relevant content passages from manuals, articles, and/or forum posts. In various examples, the multimodal dialog engine may use a reasoning model to generate a dialog to present to the user. The system may use NLG to translate structured representations of the dialog into natural language dialog for the user.

The system may store each session model as user data associated with the user account. The user data may include previous system configurations and device issues. The system may retrieve previous session models, via the user data, and allow a selection of any portion of the user data to incorporate the data into a current session for the user and/or an agent assisting the user. In some examples, the system may be integrated with existing customer support tools to accelerate time to resolution for both self-service scenario and agent-assisted scenario.

In various examples, the system may determine suggested solutions through interactive collaboration with the user to understand a present configuration and the issue with the present configuration. The system may generate diagnostics by: (1) applying a domain model that captures the causal structure of the electronic devices domain; (2) identifying, using a logical reasoning engine, and ranking possible causes for an observed and/or formulated problem; and (3) providing and managing supporting evidence, generating follow-up questions to check and test alternatives. The system may suggest solutions and use domain knowledge and/or product-specific knowledge extracted from user manuals, forums, saved diagnostic data, etc. In some examples, the system, via the user portal, may provide guidance to fix an issue. The guidance may include generating step-by-step instructions and illustrations. The user portal may include prompts for user feedback (e.g., thumbs up for positive feedback and thumbs down for negative feedback) for the suggested solutions.

The system may store session models with user feedback as training data and continuously learn from the user feedback. The system may also learn by extracting knowledge from a variety of knowledge sources (e.g., device manuals, internal knowledge bases, community forums, etc.), may generate suggested solutions from extracted knowledge, and capture user feedback based on using the extracted knowledge, and train new models with the feedback to compound knowledge over time. The system, via the user portal, may create a visually engaging and natural experience for diagnosing a problem collaboratively with the user. Over time, the user may be able to increase the reliance on the AI expertise and decrease reliance on the human expertise. The system may continuously improve based on the AI expertise growing with more training data and improved domain models. Furthermore, the system enables the user to have more efficient access to multiple sources of support, based on having their own user portals to manage their data, configuration, and history of problems and resolutions.

By integrating user feedback for generated suggestions, the system is able to continuously gather training data and can learn from the training data. For instance, based on the suggested solutions and/or related content that are marked as correct or incorrect (e.g., indicated by user feedback with one of: affirmative/"thumbs up" or negative/"thumbs down") by user feedback, the system may learn from the generated suggestion that are annotated with links to evidence passage (e.g., to a passage in a user manual). As such, as the system learns, the semantic parser, the reasoning engine, the semantic search engine, the domain models, and other components may execute more efficiently and accurately.

This system employs techniques from artificial intelligence, such as knowledge representation and reasoning (KIM) and machine learning (ML). In addition, it employs techniques from natural language processing (NLP), such as syntactic parsing, predicate-argument structure (PAS), entity type assignment, co-reference analysis, and statistical techniques such as distributional semantics (e.g. latent semantic analysis, random indexing, and topic modeling). Examples of a natural language understanding engine and associated components, including knowledge representation and reasoning engine, knowledge induction engine, knowledge accumulation engine, semantic parser, and other techniques, are discussed in U.S. Pat. No. 10,606,952, filed Jun. 24, 2016. Examples of a natural language understanding engine and associated components, including knowledge acquisition engine, semantic parser, and other techniques, are discussed in U.S. patent application Ser. No. 17/021,999, filed Aug. 8, 2020. Examples of a natural language understanding engine and associated components, including reasoning engine, semantic parser, inference engine, and other techniques, are discussed in U.S. patent application Ser. No. 17/009,629, filed Aug. 1, 2020, application Nos. 17/021,999 and 17/009,629 and U.S. Pat. No. 10,606,952 are herein incorporated by reference, in their entirety, and for all purposes.

The techniques and systems described herein may be implemented in a number of ways. Example implementations are provided below with reference to the following figures.

Illustrative Environment

FIG. 1 illustrates an example system 100 including a collaborative user support system collaborative user support system that is configured for receiving issues as natural language input, generating visual representation of the natural language input, and providing problem-solving suggestions. The system 100 may include user(s) 104 that utilizes device(s) 106 through one or more network(s) 108, to interact with the computing device(s) 102. In some examples, the network(s) 108 may be any type of network known in the art, such as the Internet. Moreover, the computing device(s) 102 and/or the device(s) 106 may be communicatively coupled to the network(s) 108 in any manner, such as by a wired or wireless connection.

The computing device(s) 102 may include any components that may be used to facilitate interaction between the computing device(s) 102 and the user(s) 104. For example, the computing device(s) 102 may configure a collaborative user support system 110 including a user portal 112, a semantic parser 114, a reasoning engine 116, a multimodal dialog engine 118, and a semantic search engine 120.

The collaborative user support system 110 may engage with the user(s) 104 via the user portal 112 through interactive dialog. In some instances, the collaborative user support system 110 can correspond to the collaborative user support system 206 of FIG. 2, where features may be described in greater detail.

The user portal 112 may generate a user interface to engage in problem-solving, sessions with the user(s) 104 by natural language expressions. In some instances, the user portal 112 can correspond to the user portal 208 of FIG. 2, where features may be described in greater detail. In various examples, the user(s) 104 may provide details about a device configuration and/or issue by speaking and/or typing natural language input and the system may return suggestions with remedies and/or related content in textual form.

The user portal 112 may generate a graphical user interface to provide guidance and prompts to collaborate with the user(s) 104 to formulate problems and find solutions. The process to generate the graphical user interface, including an example user interface 122 and other example user interfaces, to provide guidance and will be described herein with more detail with respect to FIGS. 4-11. In some examples, the user portal 112 may present questions or prompts for user input to provide additional information associated with the support request.

The user portal 112 may present graphical user interface (GUI) elements to guide user input for input scenario and explore suggested solutions. The user portal 112 may include prompts for the user 104 to enter configuration details and/or device issues. The user portal 112 may include prompts to explore suggestions and/or linked relevant passages. In some examples, the user portal 112 may present suggested solutions that includes troubleshooting steps. The troubleshooting steps may be obtained from technical documents from specific manufactures and/or different bodies of domain knowledge base ("data sources" or "domain document corpora"), including natural language text (e.g., journals, literature, documents, knowledge base, white paper, and/or structured knowledgebase).

The user portal 112 may allow a user 104 to log into a personal user account space to browse existing "tickets" with configurations, question, and/or problems. A ticket may be saved session data. For each saved session, the user 104 may explore outstanding or "closed/resolved" sessions. In various examples, the user portal 112 may allow the user 104 to: (1) add or modify saved configurations; (2) start a new session; (3) work on an unresolved session, including "Invite Agent" to provide additional suggestions; and/or (4) access stored session models associated with a user account.

In some examples, the semantic parser 114 may receive and process natural language input. In some instances, the semantic parser 114 can correspond to the semantic parser 214 of FIG. 2, where features may be described in greater detail. The semantic parser 114 may use one or more models, including machine learning models and domain models, to process the natural language input. The system may determine the domain model of the natural language input while processing the input. In some examples, the semantic parser 114 and the multimodal dialog engine 118 may process an input scenario and generate one or more questions to request additional information to formulate the problem and/or to complete the session model. In various examples, the semantic parser 114, the reasoning engine 116, and the multimodal dialog engine 118 may use the domain model with the structured representation of the user input to generate logically-reasoned suggestions. The suggestions may include, but is not limited to, solutions, diagnoses, remedial actions, treatment plans, and the like. The collaborative user support system 110 may provide the suggestions and may request a feedback for the suggestions from the user(s) 104.

The reasoning engine 116 may include a formal-logic based reasoner that operates on input queries and rules. The reasoning engine 116 may receive input queries and may return suggestions for solutions and/or related content. In some examples, the reasoning engine 116 may return a list of ranked suggestions. The list of ranked suggestions includes logically deduced diagnostic suggestions and/or pertinent passages from manuals, articles, and forum posts. In some examples, the reasoning engine 116 may generate the proof dependency graph while iteratively calling a dynamic rule generator to determine the relevant rules for the proof dependency graph. The dynamic rule generator may receive an input issue associated with a domain knowledge and determine a list of rules to return. As described herein, the domain model may include a list of facts. In some examples, the dynamic rule generator may use the list of facts to generate inferred rules. In some examples, the dynamic rule generator may implement a latent generative model that does not explicitly encode all the rules and may use a statistical modeling approach to implicitly capture the rule knowledge and generate explicit rules on demand.

The multimodal dialog engine 118 may generate multimodal presentation of a present configuration and may include user interface (UI) elements to prompt the user to edit and/or refine the configuration. In some examples, the multimodal dialog engine 118 may generate visual feedback based on the current domain model. The multimodal dialog engine 118 may generate a visual mapping or visual layout of a configuration diagram, a medical timeline, or a structured text.

The multimodal dialog engine 118 may determine a dialog to communicate to the user 104 based on a current session state. The multimodal dialog engine 118 may apply logical reasoning based on a current session state to generate dialogs to prompt, inform, guide, or query the user. In a non-limiting example, the multimodal dialog engine 118 may determine to present a dialog based on: (1) determining an explanation for a component in a diagram and/or for user interface (UI) elements, (2) determining to ask a specific question for more information, (3) proposing that the user take a particular action, and/or (4) asking a general question to formulate a problem and/or goal of the current session. The multimodal dialog engine 118 may determine the dialog for display and use a natural language generation (NLG) to translate the dialog in machine representation language to natural language dialog for the user.

In various examples, the multimodal dialog engine 118 may determine to render a visual component ("graph") in response to receiving user input. The user input may include a continuous stream of words describing an input scenario that may be typed or spoken by the user 104. In some examples, the multimodal dialog engine 118 may use the semantic parser 114 to identify components and connections between the components as the user 104 continues to describe the input scenario and may draw or otherwise generate a visual representation of any components identified in the input scenario. The visual representation may include, but is not limited to, a graph, a picture, a flow diagram, a pictorial, an architecture, and the like, of an input scenario. For instance, as depicted in the present example user portal 122, the graph includes a diagram depicting the devices in a home entertainment network and indicating the connections and signals that run between the devices. The graph is an example of an alternative representation to the natural language description. The multimodal dialog engine 118 may generate any alternative representation to provide an less ambiguous representation of a natural language systems interpretation. The multimodal dialog engine 118 may generate the graph to help confirm a shared understanding of the system with the user 104. In some examples, if the user 104 make changes to the input scenario, the multimodal dialog engine 118 may interpret the changes to the input scenario and visually represent the changes in the graph.

The semantic search engine 120 may perform a search in an associated domain text corpus. The search may include keyword(s) (e.g., the input components and/or relations between components) search in documentations and passages for terms beyond explicit keyword(s) and may include search for terms based on semantic similarity to the keyword(s). The semantic search engine 120 may output search results, including one or more evidentiary passages and/or structured knowledge representations.

The user(s) 104, via the device(s) 106, may interact with the computing device(s) 102. The user(s) 104 may include any entity, individuals, patients, health care providers, writers, analysts, students, professors, and the like. In various examples, the user(s) 104 may include formal collaborators and/or medical providers who conduct diagnosis on behalf of a patient and/or a customer. The user(s) 104 may be prompted by the system to generate training data, including marking generated suggestions with user feedback indicating affirmative or negative (e.g., thumbs up or thumbs down). The generated suggestions may include any system generated suggestions including, but not limited to, remedies found in response to input issues, evidence passages found as support of remedies or related content, causal links inferred by the system, propositions and/or hypothesis generated by the system, and the like. This user feedback and other user interactions may be used by the collaborative user support system 110 to continuously learn and improve generated results. In additional examples, the user(s) 104 may be part of an organized crowdsourcing network, such as the Mechanical Turk™ crowdsourcing platform.

The user(s) 104 may operate the corresponding device(s) 106 to perform various functions associated with the device (s) 106, which may include at least some of the operations and/or components discussed above with respect to the computing device(s) 102. The users may operate the device (s) 106 using any input/output devices including but not limited to mouse, monitors, displays, augmented glasses, keyboard, cameras, microphones, speakers, and headsets. In various examples, the computing device(s) 102 and/or the device(s) 106 may include a text-to-speech component that may allow the computing device(s) 102 to conduct a dialog session with the user(s) 104 by verbal dialog.

The device(s) 106 may receive content from the computing device(s) 102 including user interfaces to interact with the user(s) 104. In some examples, the user(s) 104 may include any number of human collaborators who are engaged by the device(s) 106 to interact with the computing device(s) 102 and verify the functions of one or more components of the computing device(s) 102. For instance, a human collaborator of the device(s) 106 may interact with the collaborative user support system 110, and the device(s) 106 may receive a list of evidence passages that the system may present as remedies and/or related content for an input scenario. In the present example, the user(s) 104 may be presented with the list of evidence passages, via a user interface, and may be asked to provide a positive or negative feedback (e.g., thumbs up or thumbs down) about whether the content of the evidence passages provides the indicated "remedy" or "related content." In some examples, in response receiving natural language input about an issue, the collaborative user support system 110 and associated components may automatically identify and present one or more component devices(s) to visually represent the device configuration and/or visually indicate the issue, and the user(s) 104 may be asked to verify whether the each component device was correctly identified and if the component devices are correctly linked to each other. The feedback and associated input scenario, generated suggestions, and/or evidence passages may be stored to help train the system.

In a non-limiting example, the collaborative user support system 110 may generate the example user portal 122 to interface with the user 104. In some instances, the example user portal 122 may include example user interface (UI) elements 124, 126, 128, 130, 132, 134, and 136.

In an example, the user portal 112 may generate the example user portal 122 to prompt the user 104 to enter input to describe a support scenario. As described herein, the user portal 112 may generate UI elements (e.g., the example UI element 124 to "Manage Session,") to allow the user 104 to: (1) add or modify current configurations; (2) start a new session; (3) work on an unresolved session, including selecting the example UI element 128 to "Invite Agent" to request support from a human agent; and/or (4) access stored session models associated with a user account.

In the present example, the example user portal 122 includes the example UI element 126 to allow the user 104 to specify a file name to replace the "Untitled" file name to save the session model.

The user portal 112 may generate the example user portal 122 to receiving input scenario from the user 104. As depicted, by the example UI element 130, the user 104 provided the input scenario as, "My speakers are connected to my TV with an HDMI cable. The TV is connected to a set-top box. The TV is also connected wirelessly to our router. I'm getting audio on the TV just fine. But the audio won't come out of the speakers."

In various examples, the multi modal dialog engine 118 may generate visual feedback corresponding to user input based on a domain model. The multimodal dialog engine 118 may determine to render a visual component ("graph") in response to receiving user input. The user input may include a continuous stream of words describing an input scenario that may be typed or spoken by the user 104. In some examples, the multimodal dialog engine 118 may use the semantic parser 114 to identify components and connections between the components as the user 104 continues to describe the input scenario and may draw or otherwise generate a visual representation of any components identified in the input scenario. The visual representation may include, but is not limited to, a graph, a picture, a flow diagram, a pictorial, an architecture, and the like, of an input scenario. For instance, as depicted in the present example user portal 122, the graph includes a diagram depicting the devices in a home entertainment network and indicating the connections and signals that run between the devices.

The multimodal dialog engine 118 may present the system understanding of the input scenario, which includes a visual layout of a configuration diagram as represented by the example UI element 132. As depicted, the example UI element 132 includes the visual layout of the devices: TV, speakers, set-top box, and a router. As described by the text in the example UI element 130, the example UI element 132 depicts the TV as connected, via a HDMI cable, to both the speakers and the set-top box, and a router is not connected by wire.

Additionally, the multimodal dialog engine 118 may generate dialogs to include determining an explanation for a component in a diagram and/or for user interface (UI) elements, determining to ask a specific question for more information, proposing that the user take a particular action, asking a general question to formulate a problem and/or goal of the current session. In the present example, the multimodal dialog engine 118 may determine based on the input scenario that the system now have six questions for the user 104.

As depicted, the multimodal dialog engine 118 may generate the visual layout to include the example UI element 134 indicating a "Diagnosis" panel. The multimodal dialog engine 118 has identified the problem as, "The speakers do not receive audio." The multimodal dialog engine 118 generated at least two suggested remedies, and presented the first remedy as, "The port on the TV with the HDMI cable connected may not be an ARC port. Make sure to use and ARC port." The second remedy is, "The HDMI cable may not be compatible with the audio. Try swapping it for a different cable that you know to be compatible. Also make sure it is firmly connected on both ends."

The user portal 112 may present the suggestions and may also present prompts, via the example UI element 136, for user feedback for each suggestion.

The collaborative user support system 110 may prompt the user(s) 104 to provide negative or positive feedback for each suggested "causes and remedies" listed in the explanation. Based on the feedback received from the user(s) 104, the system may store the individual suggestions and associated feedback to improve the semantic parser 114, the reasoning engine 116, the multimodal dialog engine 118, and the semantic search engine 120, the collaborative user support system 110, and/or other associated components.

The remaining content illustrated in the example user portal 122 will be described herein in more detail with respect to FIG. 6.

FIG. 2 is a block diagram of an illustrative computing architecture 200 of a collaborative user support system. The computing architecture 200 may be implemented in a distributed or non-distributed computing environment.

The computing architecture 200 may include one or more processors 202 and one or more computer-readable media 204 that stores various modules, data structures, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments, the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

In some embodiments, the computer-readable media 204 may store a collaborative user support system 206 and associated components, and the data store 228. The collaborative user support system 206 may include a user portal 208, a semantic search engine 210, a natural language understanding (NLU) engine 212 and associated components, a reasoning engine 218 and associated components, an active learning engine 224, and model(s) 226, which are described in turn. The components may be stored together or in a distributed arrangement.

The user portal 208 may generate a graphical user interface to collaborate with the user(s) 104. In some instances, the user portal 208 can correspond to user portal 112 of FIG. 1. As described herein with respect to the user portal 112, the user portal 208 may generate a graphical user interface to provide guidance and prompts to collaborate with the user(s) 104 to explore input scenario and remedies. The process to generate the user interface to provide guidance and prompts will be described herein in more detail with respect to FIGS. 4-10. In some examples, the graphical user interface may include prompts for user input to describe an issue associated with the support request.

The user portal 208 may present interface elements to prompt user input to formulate a problem and explore suggested solutions. The user portal 208 may include prompts for user input for device configuration details and device issues. The user portal 208 may include prompts to explore suggestions and/or linked relevant passages. In some examples, the user portal 208 may configure the user interface to guide the user input and take one or more remedial actions suggested. The remedial actions may be obtained from technical documents from specific manufactures or different bodies of domain knowledge base ("data sources" or "domain document corpora"), including natural language text (e.g., journals, literature, documents, knowledge base, white paper, and/or structured knowledgebase).

The user portal 208 may generate a user interface to guide user input to enter an input issue and explore the suggested remedies. As described herein, the collaborative user support system 206 or associated components may generate a session model to store session data.

In some examples, the user portal 208 may allow the user to create a user account associated with user data to store individual session data as session models and/or as models. The user portal 208 may allow the user 104 to define and persist a personalized set-up, model, or configuration for any topic/domain (e.g., a model of device configuration in a home entertainment system and/or a model of personal medical information). The user portal 208 may allow the user 104 to create, save, browse, open, and edit the user model and/or update the user model in response to changes in configuration. In various examples, the system may allow a user account to be associated with multiple user data and/or multiple models. For instance, an example user account may be associated with multiple user data including medical records for the user and each of their dependents. Additionally, the example user account may also be associated with multiple models including multiple device set-ups for different rooms of a home and/or for different properties. The present system allows a user associated with a user account to have control over their user data including past and present session models.

The user portal 208 allows the user to store, retrieve, and transmit their user data, and further allows the user 104 to grant access any portion of the user data to a third party. The user portal 208 allows creation of a session model and the session model may be associated with a main model for the user account. The main model may indicate an active issue the user is experiencing with their current entertainment system or a symptom a patient has been experiencing. The user portal 208 may retrieve previous session models via the user data and allow a selection of any portion of the user data (e.g., selection of one or more saved configurations or opening saved issue ticket) to incorporate the portion of the data into a current session for the user and/or an agent assisting the user. The user portal 208 may be integrated with existing customer support tools to accelerate time to resolution for both self-service scenario and agent-assisted scenario.

In various examples, the user portal 208 may receive user input describing a configuration and issues as natural language input. The user portal 208 may present a multimodal presentation of the configuration and may include user interface (IR) elements to prompt the user to edit and/or refine the configuration. In a non-limiting example, the multimodal presentation may include a visual mapping or visual layout of a network diagram, a medical timeline, or a structured text. In some examples, the user portal may receive user input to invite a knowledge expert remotely into the model environment to start a live dialog session, discuss the session model and/or the configuration, and determine any remedial actions. The session model is updated with the new information acquired in this dialog session and persisted over time including historical information.

In some examples, the user portal 208 may receive user input for specifying an input scenario and send the input scenario to the semantic search engine 210 for processing and searching.

The semantic search engine 210 may receive an input scenario and perform a search based on the input scenario. In some instances, the semantic search engine 210 can correspond to the semantic search engine 120 of FIG. 1. As described herein with respect to the semantic search engine 120, the semantic search engine 210 may perform a search based on the input scenario in an associated domain text corpus. The input scenario may be received as unstructured data format ("unstructured query" or "natural language question") or structured data format ("structured query"). The semantic search engine 210 may include a domain theory and associated text corpus for performing a search. A domain theory includes knowledge representation of a domain that indicates a specific subject area, topic, industry, discipline, and/or field in which a current application is intended to apply. In a non-limiting example, a domain may include life science, computer science, engineering, biology, chemistry, medical, business, finance, and the like. The search may include keyword(s) (e.g., the input search concept and/or relations between concepts) search in documentations and passages, web search, and embedded search for terms beyond explicit keywords.

In some examples, the semantic search engine 210 may search a database of constructed knowledge graphs based on an input query. The semantic search engine 210 may search with a structured query may return false or true with a constructed knowledge graph. The semantic search engine 210 may output search results including one or more evidentiary passages and/or knowledge graphs and the NLU engine 212 may present and/or rank the search results.

The NLU engine 212 may include a semantic parser 214 and a multimodal dialog engine 216. The NLU engine 212 may apply an interpretation process to analyze the search results. In some examples, the NLU engine 212 may use a reasoning engine (e.g., the reasoning engine 218) and/or an inference engine to help interpret the search results.

The semantic parser 214 may receive natural language input and convert the natural language text into machine-readable structured representations. The natural language input may include user input, input scenario, and user issue description.

In some examples, the semantic parser 214 may analyze the search results from the by semantically parsing the evidentiary passages and generating interpreted search results. The semantic parser 214 may parse the evidentiary passages to discover relations connecting concepts.

As described herein, in machine language, a relation is a named semantic link between concepts, and relations are verb-senses with multiple name roles. Natural human language has words with multiple inferred meanings, while machine language looks for a direct match; thus, knowledge representation allows for a machine to read the same word and may correctly interpret the meaning. A relation word may include multiple meanings to a human researcher, but not for a machine; thus, the system replaces the relation link with a semantic link to allow the system to search for "relation" words and may accept semantically similar words. A semantic link is a relational representation that connects two representations (e.g., concepts), supports interpretation and reasoning with other links, and facilitates predictive operations on representations. The semantic parser 214 may generate the interpreted search results by interpreting the search results as semantic representation.

In various examples, the semantic parser 214 may perform parsing to convert textual representations to structured knowledge. The structured knowledge may use the core theory of the reasoning engine 218 for processing. For example, suppose a core theory uses a frame-slot structure (e.g., FrameNet, Fillmore, et al., 2001) for representing concepts/relations.

In some examples, the semantic parser 214 may convert any search data, including the input query and associated query results with evidence text, as received in text form, to structured results data for other components in the system to use.

The semantic parser 214 may convert textual representations to structured knowledge. The semantic parser 214 may convert any input question/context, as received in text form, to structured queries/facts for the reasoning engine 218.

The structured knowledge may use the core-theory of the symbolic reasoning engine that is expected to process it. For example, suppose a core-theory uses a frame-slot structure (e.g. FrameNet, Fillmore et al, 2001) for representing concepts/relations, and the concept of "buying" is represented as:

frame/buy(agent: <buyer>, theme: <bought-item>)

where the predicate/relation is "frame/buying" and the arguments of the predicate (i.e., "slots") are "agent" and "theme," Wherein, given the text: "Fernando bought a plant." The semantic parser 214 may convert the text to the following structured form:

frame/buy (agent: Fernando, theme: plant).

In various examples, the semantic parser 214 may receive input scenario and may use a domain model to convert the natural language input into structured text. The semantic parser 214 may continuously parse a user input stream and generate structured text and the multimodal dialog engine 216 may generate visual representation for the structured text.

The NLU engine 212 may use natural language generation (NLG) to produce unstructured natural language representation of a structured logical form. In examples, the NLG may serve as an inverse function of the semantic parser 214. In particular, the NLU engine 212 may use NLG to translate machine representation language into natural language dialog for the user 104. The NLU engine 212 may receive structured proofs from the reasoning engine 218 and may use the NLG produce natural language explanations from the structured proofs.

The multimodal dialog engine 216 may generate a multimodal presentation of a support session. In some instances, the multimodal dialog engine 216 can correspond to the multimodal dialog engine 118 of FIG. 1. As described herein with respect to the multimodal dialog engine 118, the multimodal dialog engine 216 may generate a multimodal presentation of a configuration diagram and may include user interface (UI) elements to prompt the user to edit and/or refine the configuration diagram. In some examples, the multimodal dialog engine 216 may generate visual feedback corresponding to user input based on the current domain model. The multimodal dialog engine 216 may generate a visual mapping or visual layout of a configuration diagram, a medical timeline, or a structured text. For instance, the multimodal dialog engine 216 may generate a visual layout of a device configuration diagram for an electronic devices domain model when providing technical support for a gaming console or a medical treatment timeline for a healthcare domain model when providing user support for a treatment plan.

The multimodal dialog engine 216 may determine a dialog to communicate to the user 104 based on a current session state. The multimodal dialog engine 216 may apply logical reasoning based on a current session state to generate dialogs to prompt, inform, guide, or query the user. In a non-limiting example, to multimodal dialog engine 216 may generate dialogs to include determining an explanation for a component in a diagram and/or for user interface (UI) elements, determining to ask a specific question for more information, proposing that the user take a particular action, asking a general question to formulate a problem and/or goal of the current session. In some examples, the multimodal dialog engine 216 may generate user interface elements to prompt the user to answer questions or respond to advice indicating information relevant to diagnosis is missing. For instance, the multimodal dialog engine 216 may determine the current components diagram indicates a generic electronic device and may prompt the user to enter a make or model of the electronic device. The multimodal dialog engine 216 may determine the dialog for display and use a natural language generation NLG to translate machine code to natural language dialog to present to the user. In response to the user answering a question or advice and/or changing a visual component, the multimodal dialog engine 216 may update the session model to reflect any changes. In response to changes with input scenario, the multimodal dialog engine 216 may update visual presentation of diagnostics data to align with the input scenario.

In various examples, the multimodal dialog engine 216 may determine to render a visual component ("graph") in response to receiving user input. The user input may include a continuous stream of words describing an input scenario that may be typed or spoken by the user 104. In some examples, the multimodal dialog engine 216 may use the semantic parser 214 to identify components and connections between the components as the user 104 continues to describe the input scenario and may draw or otherwise generate a visual representation of any components identified in the input scenario. The visual representation may include, but is not limited to, a graph, a picture, a flow diagram, a pictorial, an architecture, and the like, of an input scenario. The graph is an example of an alternative representation to the natural language description. The multimodal dialog engine 216 may generate the alternative representation to reveal a less ambiguous representation of a natural language systems interpretation. The multimodal dialog engine 216 may generate the graph to help confirm a shared understanding of the system with the user 104. In some examples, if the user 104 made changes to the input scenario or a graph element, the multimodal dialog engine 216 may interpret the changes and represent the changes in an updated session model. In an additional and/or alternative example, the multimodal dialog engine 216 may use the reasoning engine 218 to determine if any suggested remedies and/or relevant articles should also be updated to reflect the changes. For instance, if a user answers a question about a make or model of a device that was not working properly, the multimodal dialog engine 216 and the reasoning engine 218 may identify a new suggestion based on the specific make or model of the device.

In some examples, the multimodal dialog engine 216 and/or the user portal 208 may receive user input that changes the graph and update the session model to reflect the change. The multimodal dialog engine 216 and/or the user portal 208 may receive user input to invite a knowledge expert remotely into the model environment to start a live dialog session, discuss the session model and/or the configuration, and determine any remedial actions. The multimodal dialog engine 216 may update the session model with any new information acquired in this dialog session and persisted over time including historical information.

In some examples, the multimodal dialog engine 216 may configure user interface elements to guide the user input to explore suggested remedies and/or relevant articles found in a large body of knowledge ("data sources"), including natural language text (e.g., journals, literature, documents, knowledge base, market research documents, and/or structured databases). The multimodal dialog engine 216 may present the one or more suggestions with one or more interactable links to technical documents. The knowledge sources may include any print media or electronic sources and any unstructured, semi-structured, and structured knowledge. Non-limiting examples of knowledge sources may include manuscripts, letters, interviews, records, textbooks, magazine articles, book reviews, commentaries, encyclopedias, almanacs, books, brochures, journals, magazines, newspapers, medical ontologies, research articles, clinical reports, case studies, dissertations, peer-reviewed articles, knowledge graphs, research papers, clinical studies, music, video, photos, and the like. As described herein, the multimodal dialog engine 216 may generate suggestions (e.g., suggested remedies and/or relevant articles) and the NLU engine 212 may determine a ranking for the suggestions. The user portal 208 may present the suggestions in ranked order. The user portal 208 may also present prompts for user feedback for each suggestion.

The reasoning engine 218 may include a domain rules component 220 and a dynamic rules generator 222. The reasoning engine 218 may leverage its components, the model(s) 226, and the data store 228 to build and evolve the knowledge base of static and inference rules. The reasoning engine 218 may collect natural language data, retrieve static rules, general rules templates, and inferred rules as needed by the components. In various examples, the reasoning engine 218 and/or one or more associated components may be part of a standalone application that may be installed and stored on the device(s) 106.

The reasoning engine 218 may receive an input query with context and may determine the answer to the query. The context may include a set of facts against which to evaluate the query. As described herein, the reasoning engine 218 may include a formal-logic based reasoner that operates on structured queries and rules. The reasoning engine 218 may determine the answer to the query by identifying explanations (also referred to as "proofs"). The reasoning engine 218 may return the explanations and/or logically valid remedy. A logically valid remedy may include a proof dependency graph that explains the remedy with context. The reasoning engine 218 may generate the proof dependency graph while iteratively interacting with the domain rules component 220 determines the relevant rules for the proof dependency graph.

In various examples, the reasoning engine 218 may use any portion of the static rules, inference rules, and/or general rule templates, stored in the data store 228, as input to train one or more reasoning model(s).

In some instances, the reasoning engine 218 can correspond to the reasoning engine 116 of FIG. 1.

The domain rules component 220 may configure one or more static rule knowledge base (KB) for individual domain models. The domain rules component 220 may receive an input issue in context of a particular knowledge domain and may return a ranked list of suggestion given the domain knowledge. Each rule from the ranked list of rules may prove the input goal and may include associated confidence and/or precision. Confidence (also referred herein as "confidence value" or "confidence score") indicates the likelihood that an associated rule is true. In some examples, the confidence may be expressed as a confidence value and/or a conditional probability. The domain rules component 220 may retrieve a list of rules, which may be ranked based on confidence, using the domain rules component 220 and/or the dynamic rule generator 222. In some examples, the domain rules component 220 may rank and/or re-rank the rules after retrieving the rules. In various examples, the ranking of the rules may be determined based at least in part on the associated confidence or in the case of multiple rules, the associated composite confidence. In some examples, the domain rules component 220, the domain rules component 220, and the dynamic rule generator 222 may produce and/or retrieve rules that conform to the core-theory supported by the reasoning engine 218. In an alternative and/or additional example, the domain rules component 220 and associated components may use a translator to convert the rules to conform to the core-theory supported by the reasoning engine 218.

The domain rules component 220 may include a knowledge base of a fixed collection of rules including causal rules associated with the domain model. In various examples, the rules from the collection of rules may individually be associated with confidences.

In some examples, the domain rules component 220 may receive a goal with the context and may return a list of rules based on the reasoning algorithm implemented. For instance, the reasoning engine 218 may implement a backward direction algorithm, the domain rules component 220 may return a list of rules whose consequent unifies (matches) the goal and the rules have "relevance-similarity," which is determined using a similarity function, to the context greater than predetermined threshold confidence. In an alternative and/or additional example, the reasoning engine 218 may implement a forward direction algorithm, the domain rules component 220 may return a list of rules with antecedents that unifies with the goal, wherein the goal may be a conjunction of logical formulae.

The dynamic rule generator 222 may receive a target proposition (e.g., input goal) and may output a scored list of hypothesized rules that could be used to prove the target proposition. In some examples, the dynamic rule generator 222 may receive a knowledge base (KB) as input and may determine one or more general rule templates to use. The dynamic rule generator 222 may use the input KB to help connect the dots when the knowledge required for inference is missing from a static KB (e.g., cannot be found by the domain rules component 220). The general rule templates may include rules with variables to be replaced with constants.

In various examples, the dynamic rule generator 222 may implement a latent generative model that does not explicitly encode all the rules and may use a statistical model approach to implicitly capture the rule knowledge and generate explicit rules on demand. The dynamic rule generator 222 may use a statistical model trained on structured rule applications in different knowledge domains. The statistical model may generate new rules each leading to the target proposition (e.g., input goal) and associate each rule with a certain precision/confidence. The dynamic rule generator 222 can generate unstructured or structured probabilistic rules given a specific context.

In some examples, the active learning engine 224 and other components of the collaborative user support system 206 may improve from feedback received from the user(s) 104. For instance, as described herein with respect to FIG. 1, when the example UI element 134 indicating "remedies" is presented to the user(s) 104 in the example user interface 122, the active learning engine 224 may receive user feedback, via the example UI element 136, on which indicates if a suggested remedy from the example UI element 134 is correct or incorrect (e.g., thumbs up or thumbs down). As described here, this user feedback is used to generate training data to improve models for the NLU engine 212, the reasoning engine 218 (e.g., the knowledge in a reinforcement learning strategy that guides the proof exploration process), and the model(s) 226.

In various examples, the system may train one or more ML model(s) 226 using labeled data as training data. Machine learning generally involves processing a set of examples (called "training data") to train one or more ML model(s) 226. The model(s) 226, once trained, is a learned mechanism that can receive new data as input and estimate or predict a result as output. Additionally, the model(s) 226 may output a confidence score associated with the predicted result. The confidence score may be determined using probabilistic classification and/or weighted classification. For example, a trained ML model(s) 226 can comprise a classifier that is tasked with classifying unknown input as one of the multiple class labels. In additional examples, the model (s) 226 can be retrained with additional and/or new training data labeled with one or more new types (e.g., rules) to teach the model(s) 226 to classify unknown input by types that may now include the one or more new types.

In additional and/or alternative examples, the ML model (s) 226 may include a generative model which is a statistical model that can generate new data instances. Generative modeling generally involves performing statistical modeling on a set of data instances X and a set of labels Y in order to determine the joint probability p(X, Y) or the joint probability distribution on X×Y. In various examples, the statistical model may use neural network models to learn an algorithm to approximate the model distribution. In some examples, the generative model may be trained to receive input conditions as context and may output a full or partial rule. In an additional example, the generative model may include a confidence calibrator which may output the confidence associated with the rule generated by the generative model. As described herein, the dynamic rule generator 222 may use a generative model that generates unstructured probabilistic rules and/or structured probabilistic rules based on the input context.

In the context of the present disclosure, the input may include, data that is to be handled according to its context, and the trained ML model(s) 226 may be tasked with receiving an input goal and outputting a rule that connects the input goal with the context. For instance, as described herein, the system may use a generative model that receives an input goal, "Person motivated to buy X" and an input context which includes facts such as, "Person likes X", and the generative model can connect the context to the goal via a rule such as "Person likes X→motivates Person to buy X" and return the generated rule.

In some examples, the trained ML model(s) 226 may classify an input query with context as relevant to one of the inference rules and determine an associated confidence score. In various examples, if the trained ML model(s) 226 has low confidence (e.g., a confidence score is at or below a low threshold) in its proof for an explanation to an input query, this low confidence may return no rules found. An extremely high confidence score (e.g., a confidence score is at or exceeds a high threshold) may indicate the rule is a proof for an input query. After the inference rule has been applied to an explanation, the data with the inference rules may be labeled as correct or incorrect by a user, the data may be used as additional training data to retrain the model(s) 226. Thus, the system may retrain the ML model(s) 226 with the additional training data to generate the new ML model(s) 226. The new ML model(s) 226 may be applied to new inference rules as a continuous retraining cycle to improve the rules generator.

The ML model(s) 226 may represent a single model or an ensemble of base-level ML models and may be implemented as any type of model(s) 226. For example, suitable ML model(s) 226 for use with the techniques and systems described herein include, without limitation, tree-based models, k-Nearest Neighbors (kNN), support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation-maximization, genetic algorithms, linear regression algorithms, nonlinear regression algorithms, logistic regression-based classification models, linear discriminant analysis (LDA), generative models, discriminative models, or an ensemble thereof. An "ensemble" can comprise a collection of the model(s) 226 whose outputs are combined, such as by using weighted averaging or voting. The individual ML models of an ensemble can differ in their expertise, and the ensemble can operate as a committee of individual ML models that are collectively "smarter" than any individual machine learning model of the ensemble.

The data store 228 may store at least some data including, but not limited to, data collected from the NLU engine 212, the reasoning engine 218, the active learning engine 224, and the model(s) 226, including data associated with rules data, knowledge base data, core theory data, natural language data, general rule templates data and training data. In some examples, the data may be automatically added via a computing device (e.g., the computing device(s) 102, the device(s) 106). The rules data may include static rules data and generated inference rules data and may correspond to one or more context. In various examples, the static rules data may include a fixed collection of rules, the individual rules may be associated with a confidence level. As described herein, the reasoning engine 218 may operate over a specific core theory of logical forms (e.g., logical predicates, functions, formulae) which can be interpreted by the reasoner, and the core theory data may include vocabulary data and any data to produce rules that conform to the core-theory. For instance, if the core-theory uses a frame-slot structure (e.g. FrameNet) for representing concepts/relations, then the core theory data may include frame structure data, concept and relationship data, ontology data, and the like. Training data may include any portion of the data in the data store 228 that is selected to be used to train one or more ML models. In additional and/or alternative examples, at least some of the data may be stored in a storage system or other data repository.

Figure 3:
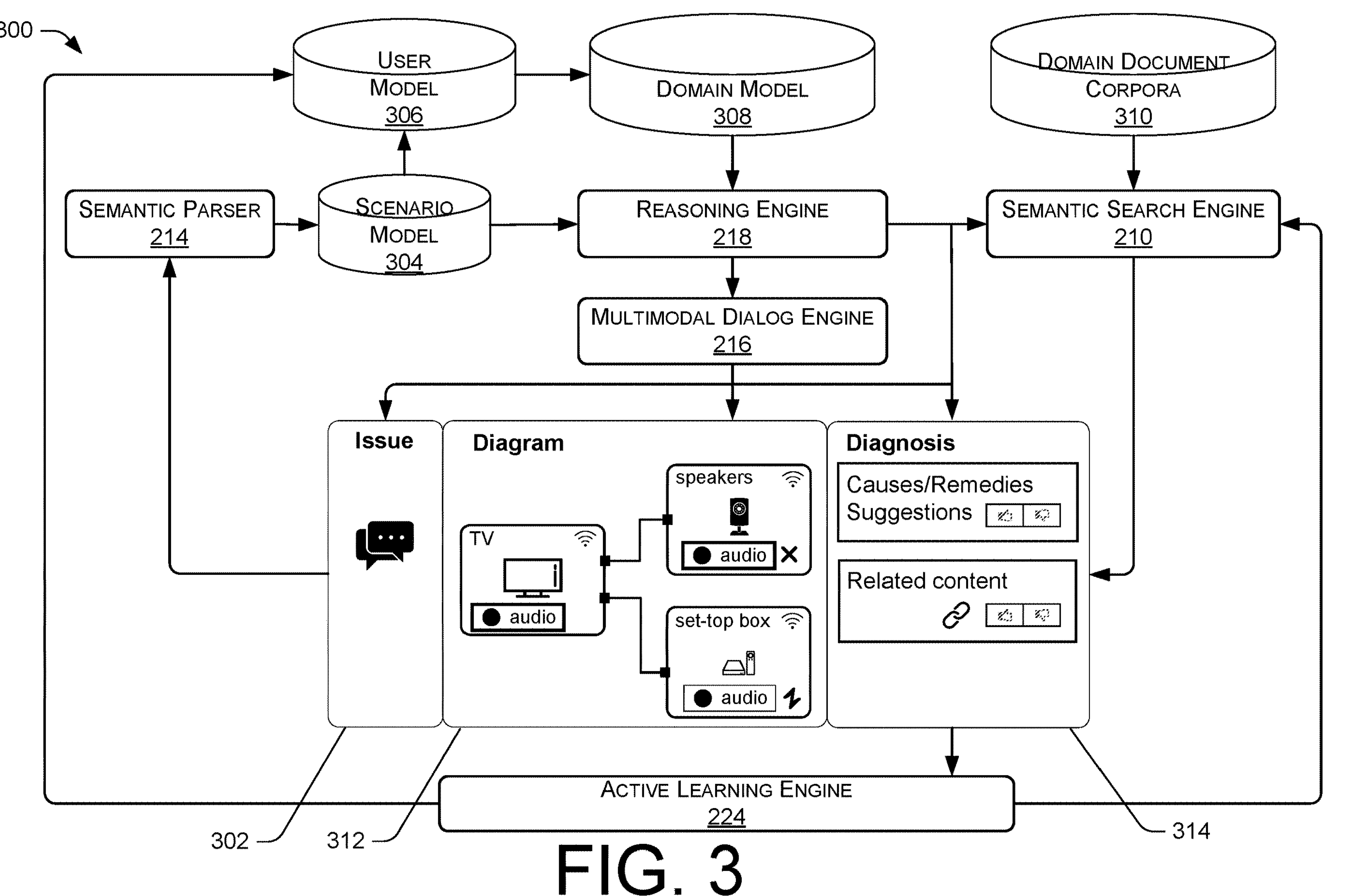
FIG. 3 illustrates an example implementation of database and models that may be configured to be used with components of a collaborative user support system, as described herein.

FIG. 3 illustrates an example implementation 300 of databases and models that may be configured to be used with components of a collaborative user support system. The select components may include the semantic parser 214, the reasoning engine 218, the multimodal dialog engine 216, the semantic search engine 210, and the active learning engine 224. The databases and models may include a scenario model 304, a user model 306, a domain model 308, and a domain document corpora 310.

The multimodal dialog engine 216 allows the computing device(s) 102 to engage in dialog sessions with the user(s) 104 via the device(s) 106. The example processes and process data may include example issue 302, example diagram 312, and example diagnosis 314.

As a non-limiting example, the multimodal dialog engine 216 may receive the example issue 302 as a request for support and the multimodal dialog engine 216 may call the semantic parser 214 to convert the textual form of the example issue 302 to a structured representation of the example issue 302. The issue description of the example issue 302 may be converted to structured representation.

In some examples, the multimodal dialog engine 216 and the reasoning engine 218 may use one or more models from the scenario model 304, the user model 306, and the domain model 308 to determine an example visual component diagram 312. The semantic parser 214 may generate and pass the structured representation to the reasoning engine 218. The multimodal dialog engine 216 may determine to render visual components as depicted in the example diagram 312. Also as depicted, the example diagram 312 includes visual components of a TV, speakers, and a set-top box, wherein the structured facts of the example diagram 312 includes "TV connected to speakers" and "TV connected to set-top box."

In some examples, the semantic search engine 210 may receive the structured representation of the example issue 302 and conduct a search in the domain document corpora 310. The multimodal dialog engine 216 may receive the search results from the semantic search engine 210 and the present the example diagnosis 314. The example diagnosis 314 may include a first suggestion for remedies and a second suggestion for related content and prompts for user feedback for each suggestion. The active learning engine 224 may store the user feedback with the example issue 302 and the suggestions in the example diagnosis 314 as training data.

Figure 4:
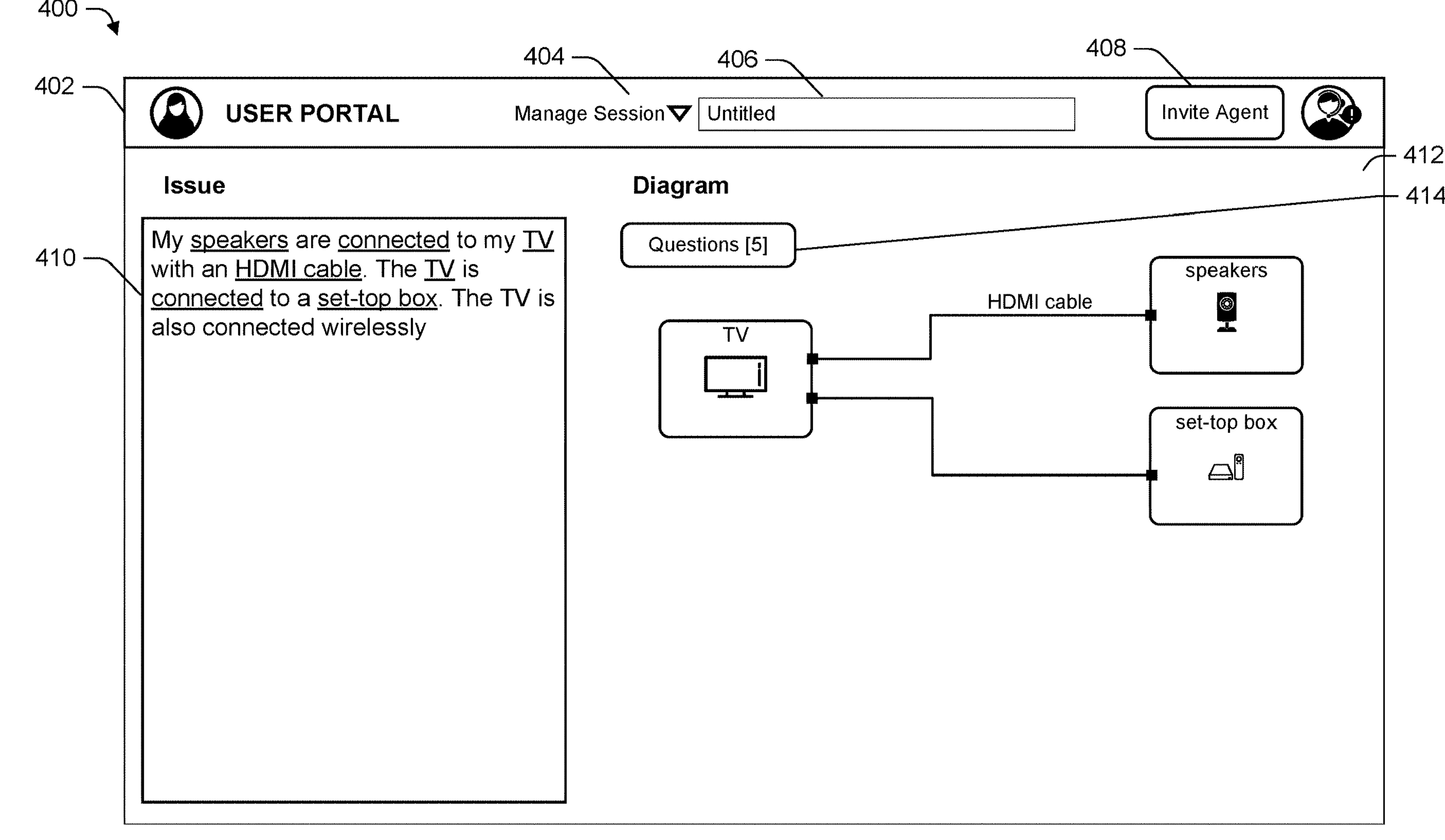
FIG. 4 illustrates an example user interface for initiating support requests using the collaborative user support system, as discussed herein.

FIG. 4 illustrates an example user interface 400 for initiating support request using the collaborative user support system 206, as discussed herein. In some instances, the example user interface 400 may present example user portal 402, including example user interface (UI) elements 404, 406, 408, 410, 412, and 414.

In a non-limiting example, the user portal 208 may generate the example user portal 402 to prompt the user 104 to enter input to describe a support scenario. As described herein, the user portal 208 may generate UI elements (e.g., the example UI element 404 to "Manage Session,") to allow the user 104 to: (1) add or modify current configurations; (2) start a new session; (3) work on an unresolved session, including selecting the example UI element 408 to "Invite Agent" to request support from a human agent; and/or (4) access stored session models associated with a user account.

In the present example, the example user portal 402 includes the example UI element 406 to allow the user 104 to specify a file name to replace the "Untitled" file name to save the session model.

In an additional example, as described herein, the multimodal dialog engine 216 may generate visual feedback corresponding to user input based on the current domain model.

The semantic parser 214 may continuously parse user input stream and convert the user input into structured text and the multimodal dialog engine 216 may generate visual representation for the structured text. The semantic parser 214 may use a domain model and determine the structured text may indicate the relational text and components text.

The multimodal dialog engine 216 may generate a visual layout of structured text as visually indicated by the example UI element 410. The user portal 208 presents the structured text of the user scenario in natural language with, "My speakers are connected to my TV with an HDMI cable. The TV is connected to a set-top box. The TV is also connected wirelessly." The multimodal dialog engine 216 may determine that the user 104 is not done describing the scenario based on a lack of description of an issue. As described herein, the semantic parser 214 may use a domain model and generate the structured text to indicate the concepts and relationship between concepts. For instance, the example UI element 410 visually indicates concepts and relationships by underlining the words, "speakers," "connected," "TV," "HDMI cable," "TV," "connected," and "set-top box."

The multimodal dialog engine 216 may present the system understanding of the user scenario including a visual layout of a device configuration diagram for an electronic devices domain model as represented by the example UI element 412. The visual layout presents a graph representing concepts/devices, "speakers," "TV," and "set-top box" as nodes of the graph and the relationships "connected," and "HDMI cable," are depicted as links between of the graph. The visual layout of the device configuration diagram depicts a TV connected to speakers, via HDMI cable, and TV connected to a set-top box.

In some examples, the multimodal dialog engine 216 may generate dialogs to include determining an explanation for a component in a diagram and/or for user interface (UI) elements, determining to ask a specific question for more information, proposing that the user take a particular action, asking a general question to formulate a problem and/or goal of the current session. In the present example, the multimodal dialog engine 216 may generate the example UI element 414 to prompt the user 104 to answer questions. For instance, the multimodal dialog engine 216 may determine the current components diagram indicates generic components and may determine that knowing the make and model of a component may help with troubleshooting a device. The multimodal dialog engine 216 may present the example UI element 414 to indicate the system has five questions for the user 104.

Figure 5:
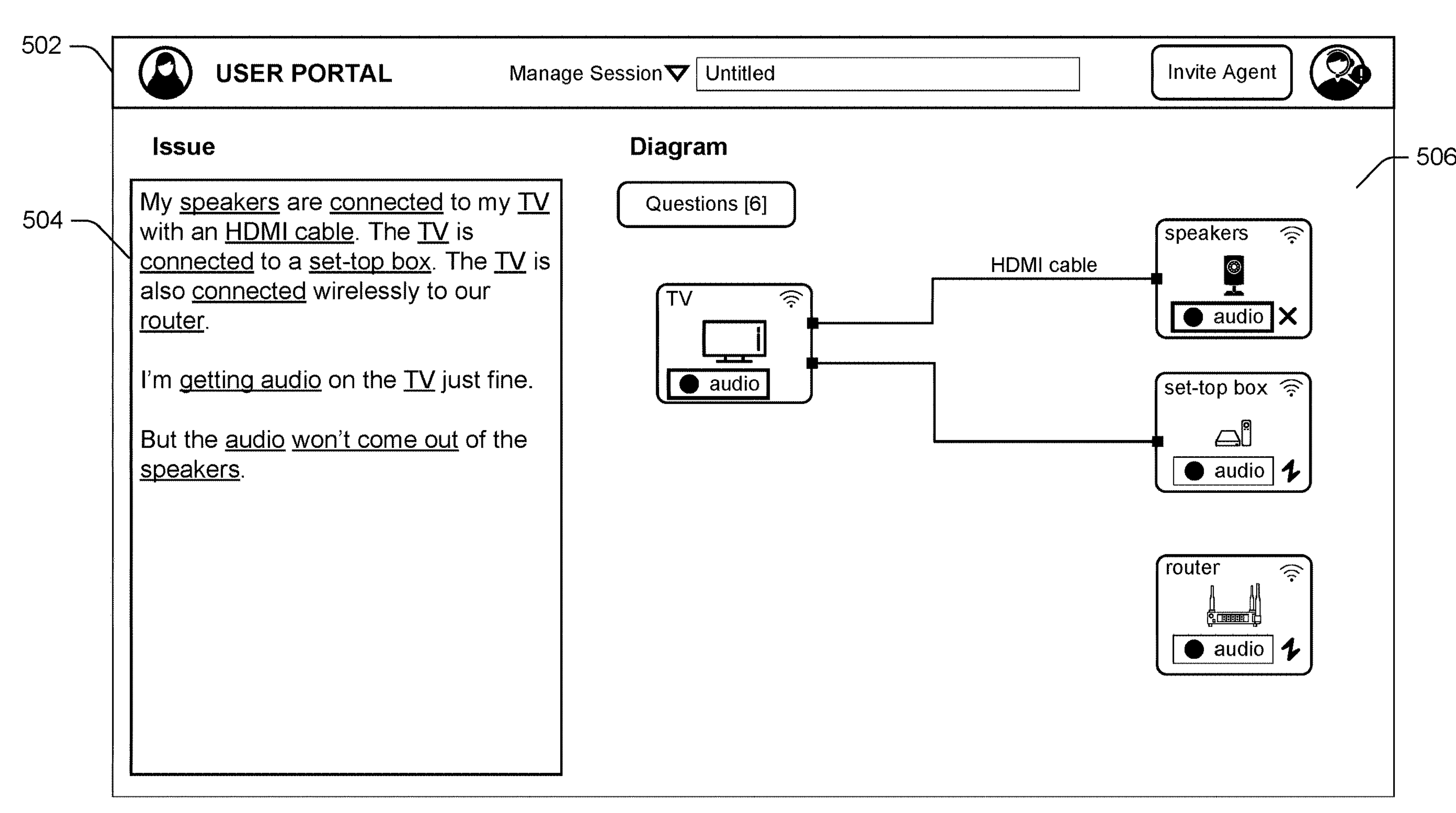
FIG. 5 illustrates an example user interface for entering an input scenario using the collaborative user support system, as discussed herein.

FIG. 5 illustrates an example user interface 500 for receiving support request including a network issue using the collaborative user support system 206, as discussed herein. In some instances, the example user interface 500 may present an example user portal 502, including example user interface (UI) elements 504 and 506.

The user portal 208 may generate the example user portal 502 to continue receiving user input describing the user scenario following the example illustrated in FIG. 4. As depicted, following the example in FIG. 4, as depicted by the example UI element 504, the user 104 provided additional user input and described the scenario as, "My speakers are connected to my TV with an HDMI cable. The TV is connected to a set-top box. The TV is also connected wirelessly to our router. I'm getting audio on the TV just fine. But the audio won't come out of the speakers."

In a non-limiting example, the user portal 208 may generate the example user portal 502 to continue to prompt the user 104 to finish entering input to describe the support scenario.

In the present example, as described herein, the multimodal dialog engine 216 may generate visual feedback corresponding to user input based on the current domain model. The multimodal dialog engine 216 may present the system understanding of the user scenario, which now includes a visual layout of a device configuration diagram for an electronic devices domain model as represented by the example UI element 506. As depicted, the visual layout now includes, "The TV is also connected wirelessly to our router. I'm getting audio on the TV just fine. But the audio won't come out of the speakers."

As described herein, the semantic parser 214 may use a domain model and generate the structured text to indicate the concepts and relationship between concepts. For instance, the example UI element 504 visually indicates new concepts and relationships by underlining the words, "TV," "connected," "router," "getting audio," "TV," "audio," "won't come out" and "speakers."

The example UI element 506 includes visual layout with a graph representing the new concepts/devices, "router." Additionally, the visual layout of the device configuration diagram now depicts audio on the devices and indicates no audio on the speakers.

Additionally, the multimodal dialog engine 216 may generate dialogs to include determining an explanation for a component in a diagram and/or for user interface (UI) elements, determining to ask a specific question for more information, proposing that the user take a particular action, asking a general question to formulate a problem and/or goal of the current session. In the present example, the multimodal dialog engine 216 may determine based on the additional scenario that the system now have six questions for the user 104.

Figure 6:
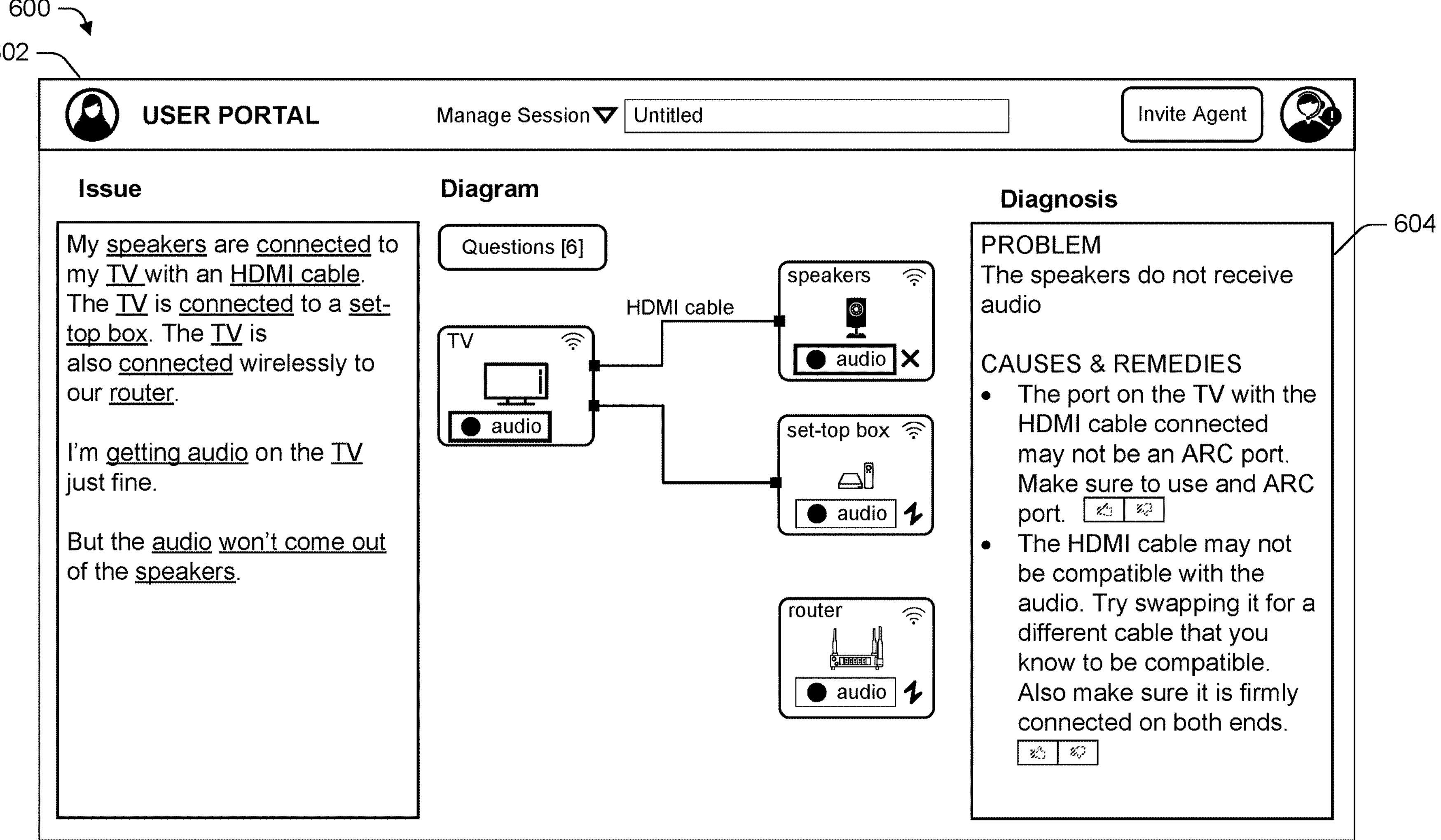
FIG. 6 illustrates an example user interface for diagnosing a problem to suggest remedies using the collaborative user support system, as described herein.

FIG. 6 illustrates an example user interface 600 for receiving support request and providing suggested remedies using the collaborative user support system 206, as described herein. In some instances, the example user interface 600 may present an example user portal 602, including an example user interface (UT) element 604.

The user portal 208 may generate the example user portal 602 to continue receiving user input following the example illustrated in FIG. 5. As depicted, following the example in FIG. 5, as depicted by the example UI element 604, the multimodal dialog engine 216 may configure user interface elements to guide user input to explore suggested remedies and/or relevant articles found in a large body of knowledge ("data sources"), including natural language text (e.g., journals, literature, documents, knowledge base, market research documents, and/or structured databases).

As depicted, the visual layout now includes the example UI element 604 indicating a "Diagnosis" panel, and the multimodal dialog engine 216 has generated suggested remedies. The user portal 208 may present the suggestions and may also present prompts for user feedback for each suggestion.

The multimodal dialog engine 216 has identified the problem as, "The speakers do not receive audio." The multimodal dialog engine 216 generated at least two suggested remedies, and presented the first remedy as, "The port on the TV with the HDMI cable connected may not be an ARC port. Make sure to use and ARC port." The second remedy is, "The HDMI cable may not be compatible with the audio. Try swapping it for a different cable that you know to be compatible. Also make sure it is firmly connected on both ends."

Figure 7:
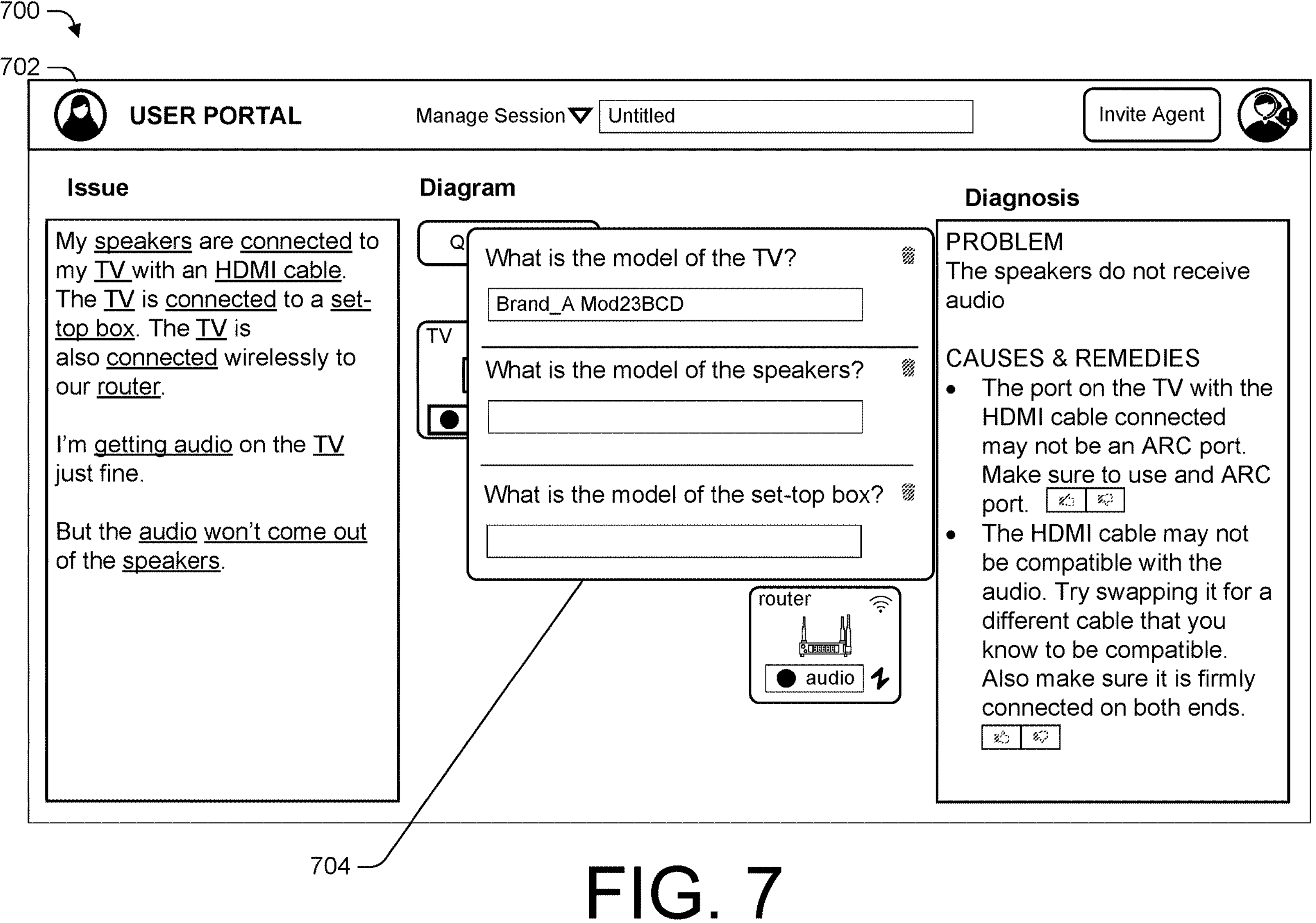
FIG. 7 illustrates an example user interface for presenting questions to identify component models using the collaborative user support system, as discussed herein.

FIG. 7 illustrates an example user interface 700 for receiving support request including a prompt to identify component models using the collaborative user support system 206, as discussed herein. In some instances, the example user interface 700 may present an example user portal 702, including an example user interface (UI) element 704.

The user portal 208 may generate the example user portal 702 to continue receiving user input following the example illustrated in FIG. 6. As depicted, following the example in FIG. 6, as depicted by the example UI element 704, the multimodal dialog engine 216 may generate dialogs to include determining to ask a specific question for more information, proposing that the user take a particular action, asking a general question to formulate a problem and/or goal of the current session. In the present example, the multimodal dialog engine 216 may generate the example UI element 704 to prompt the user 104 to answer questions. For instance, the multi modal dialog engine 216 may determine the current components diagram indicates generic components and may determine that knowing the make and model of a component may help with troubleshooting a device. The multimodal dialog engine 216 may present the example UI element 704 to prompt the user to answer questions. In some examples, as the user begin to type the answer, the multimodal dialog engine 216 may use a domain model to provide autocomplete suggestions while responding to, "What is the model of the TV?" The example UI element 704 also includes second question for, "What is the model of the speakers?" And, "What is the model of the set-top box?"

Figure 8:
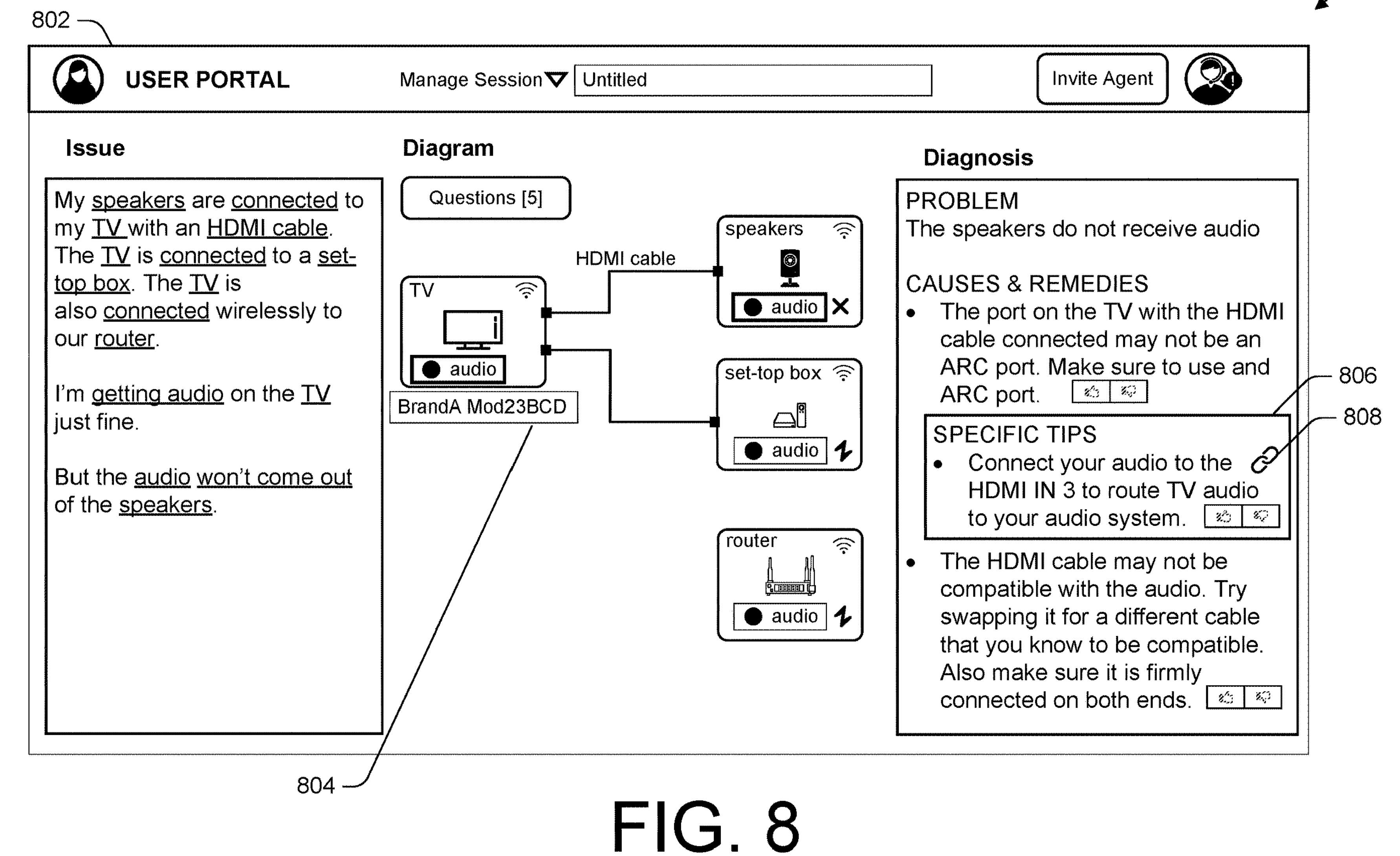
FIG. 8 illustrates an example user interface for incorporating user provided information to a component diagram using the collaborative user support system, as discussed herein.

FIG. 8 illustrates an example user interface 800 for receiving support request and providing suggested remedies with specific suggesting based on component model input using the collaborative user support system 206, as discussed herein. In some instances, the example user interface 800 may present an example user portal 802, including example user interface (UI) elements 804, 806, and 808.

The user portal 208 may generate the example user portal 802 to continue receiving user input following the example illustrated in FIG. 7. As depicted, following the example in FIG. 7, as depicted by the example UI element 804, in response to the user answering a question, the multimodal dialog engine 216 may update the session model to reflect the change to include the make and model of the TV. In some examples, if the user 104 made changes to the input scenario or a graph element, the multimodal dialog engine 216 may interpret the changes and represent the changes in an updated session model. In an additional and/or alternative example, the multimodal dialog engine 216 may use the reasoning engine 218 to determine if any suggested remedies and/or relevant articles should also be updated to reflect the changes. For instance, if a user answers a question about a make or model of a device that was not working properly, the multimodal dialog engine 216 and the reasoning engine 218 may identify a new suggestion based on the specific make or model of the device.

In the present example, the multimodal dialog engine 216 may update the session model to reflect the make and model of the TV is "BrandA Mod23BCD." Additionally, the multimodal dialog engine 216 and the reasoning engine 218 has identified a new suggestion as depicted by the example UI element 806 that indicates a specific tip for, "Connect your audio to the HDMI IN 3 to route TV audio to your audio system." The user portal 208 may include prompts to explore suggestions and/or linked relevant passages. For instance, the user portal 208 may generate the example IR element 808 to a link to an evidence passage from a user manual for the particular make and model of TV. In some examples, the user portal 208 may configure the user interface to guide the user input and take one or more remedial actions suggested. The remedial actions may be obtained from technical documents from specific manufactures or different bodies of domain knowledge base ("data sources" or "domain document corpora"), including natural language text (e.g., journals, literature, documents, knowledge base, white paper, and/or structured knowledgebase.

Figure 9:
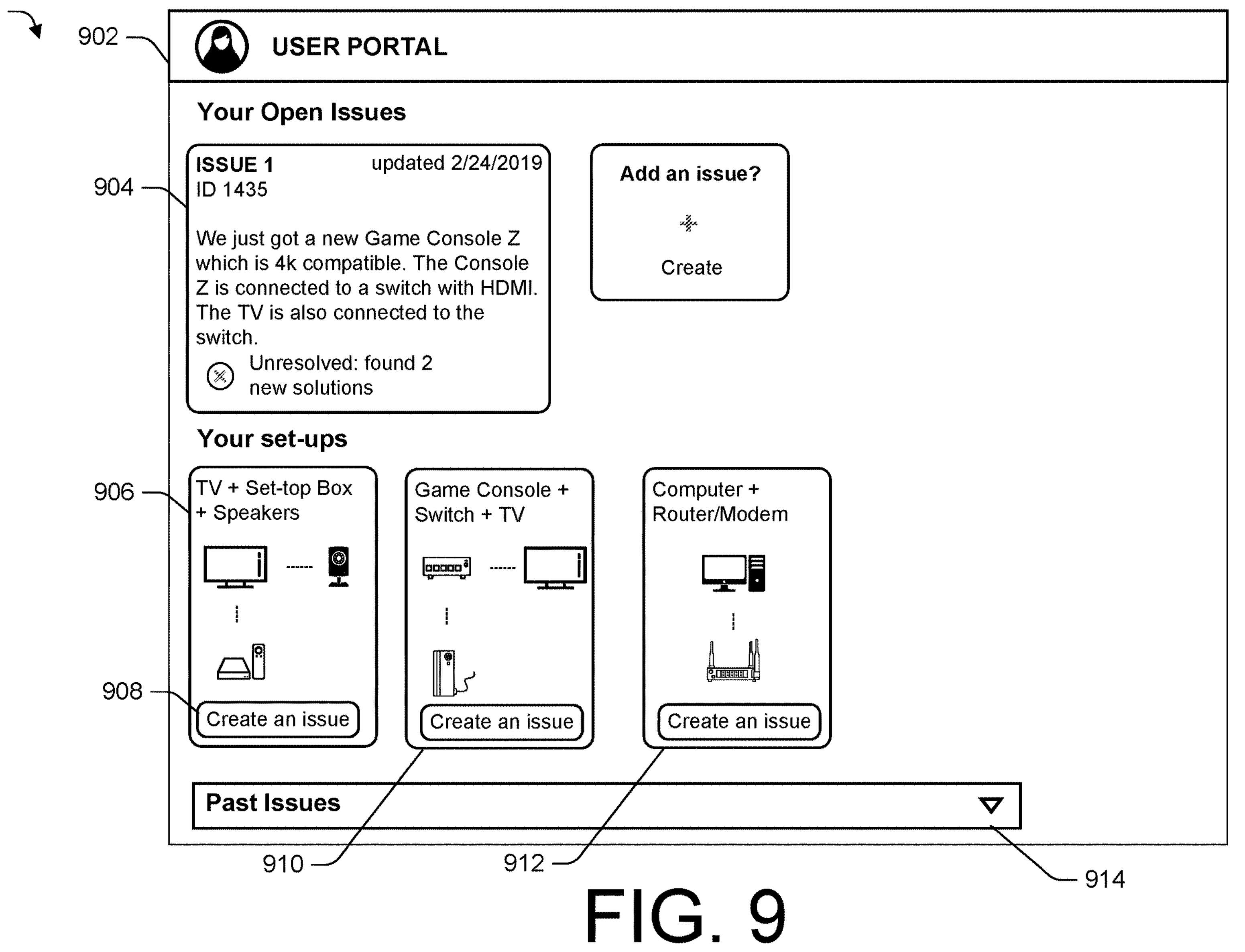
FIG. 9 illustrates an example user interface for viewing open issues, system configuration, and past issues using the collaborative user support system, as discussed herein.

FIG. 9 illustrates an example user interface 900 for reviewing open issues, network configuration, and past issues using the collaborative user support system 206, as discussed herein. In some instances, the example user interface 900 may present an example user portal 902, including example open issue 904, example setups 906, 910, and 912, and example user interface (UI) elements 908 and 914.

In a non-limiting example, the user portal 208 may allow the user 104 to define and persist a personalized set-up, model, or configuration for any topic/domain (e.g., a model of device configuration in a home entertainment system and/or a model of personal medical information). The user portal 208 may allow the user 104 to create, save, browse, open, and edit the user model and/or update the user model in response to changes in configuration.

For examples, the user portal 208 has saved the example open issue 904. As depicted, the user has an open issue ticket with identifier "1435", and text, "We just got a new Game Console Z which is 4 k compatible. The Console Z is connected to a switch with -HDMI. The TV is also connected to the switch."

In various examples, the system may allow a user account to be associated with multiple user data and/or multiple models. For instance, the present example user account may be associated the example setups 906, 910, and 912. Additionally, the example user account may also be associated with multiple models including multiple device set-ups for different rooms of a home and/or for different properties.

The user portal 208 may retrieve previous session models via the user data and allow a selection of any portion of the user data (e.g., selection of one or more saved configurations or opening saved issue ticket) to incorporate the portion of the data into a current session for the user and/or an agent assisting the user. The user portal 208 may create a session based on components in the example setups 906 in response to user selection of the example UI element 908.

The present system allows a user associated with a user account to have control over their user data including past and present session models. For example, the user portal 208 may allow the user 104 to create, save, browse, open, and edit the user model via the example UT element 914.

Figure 10:
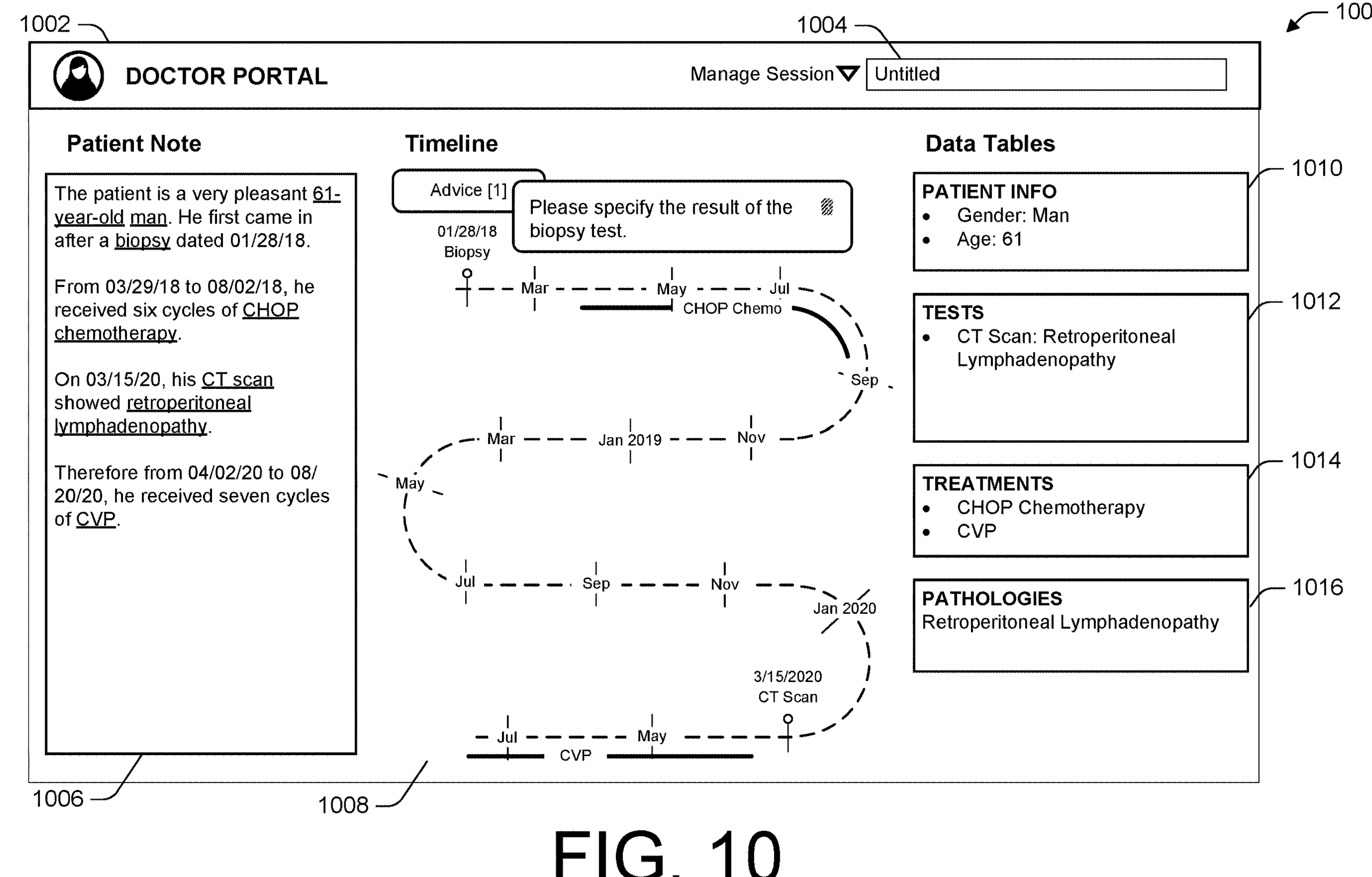
FIG. 10 illustrates an example user interface for a user portal presenting a suggestion in the medical domain using the collaborative user support system, as discussed herein.

FIG. 10 illustrates an example user interface 1000 for a user portal 208 presenting a suggestion in the healthcare domain using the collaborative user support system 206, as discussed herein. In some instances, the example user interface 1000 may present an example doctor portal 1002, including example user interface (UI) elements 1004, 1006, 1008, 1010, 1012, 1014, and 1016.

In a non-limiting example, the user portal 208 may generate the example doctor portal 1002 to prompt the user 104 to enter input to describe a healthcare support scenario. As indicated by the "Doctor Portal," the collaborative user support system 206 is configured to implement a healthcare domain model.

As described herein, the user portal 208 may generate UI elements (e.g., the example UI element 1004 to "Manage Session,") to allow the user 104 to: (1) add or modify current configurations; (2) start a new session; (3) work on an unresolved session; and/or (4) access stored session models associated with a user account. Additionally, the user portal 208 may generate the example UI element 1004 to includes a name field to allow the user 104 to replace the "Untitled" file name and save the session model.

In the present example, the present support system is configured implement the healthcare domain model. The multimodal dialog engine 216 may generate a visual mapping for a medical timeline and visual layout of a structured text. For instance, the multimodal dialog engine 216 may generate a visual layout of structured text as visually indicated by the example UI element 1006. The example UI element 1006 depicts the text for a "Patient Note" indicating, "The patient is a very pleasant 61-year-old man. He first came in after a biopsy dated Jan. 28, 2018. From Mar. 29, 2018 to Aug. 2, 2018, he received six cycles of CHOP chemotherapy. On Mar. 15, 2020, his CT scan showed retroperitoneal lymphadenopathy. Therefore from Apr. 2, 2020 to Aug. 20, 2020, he received seven cycles of CVP."

In an additional example, the multimodal dialog engine 216 may generate the example UT element 1008 to present a visual layout of a medical treatment timeline for a treatment plan.

The multimodal dialog engine 216 may also present diagnostic elements including the example UI element 1010, the example UI element 1012, the example UI element 1014, and the example UI element 1016.

As depicted by the example UT element 1008, the multimodal dialog engine 216 may generate dialogs to include determining to ask a specific question for more information, proposing that the user take a particular action, asking a general question to formulate a problem and/or goal of the current session. In the present example, the multimodal dialog engine 216 may determine the patient note is missing an important medical test result and may generate the example UI element 1008 including the interactable button for "Advice [1]" to prompt the user 104 to provide additional information, "Please specify the result of the biopsy test."

Figure 11:
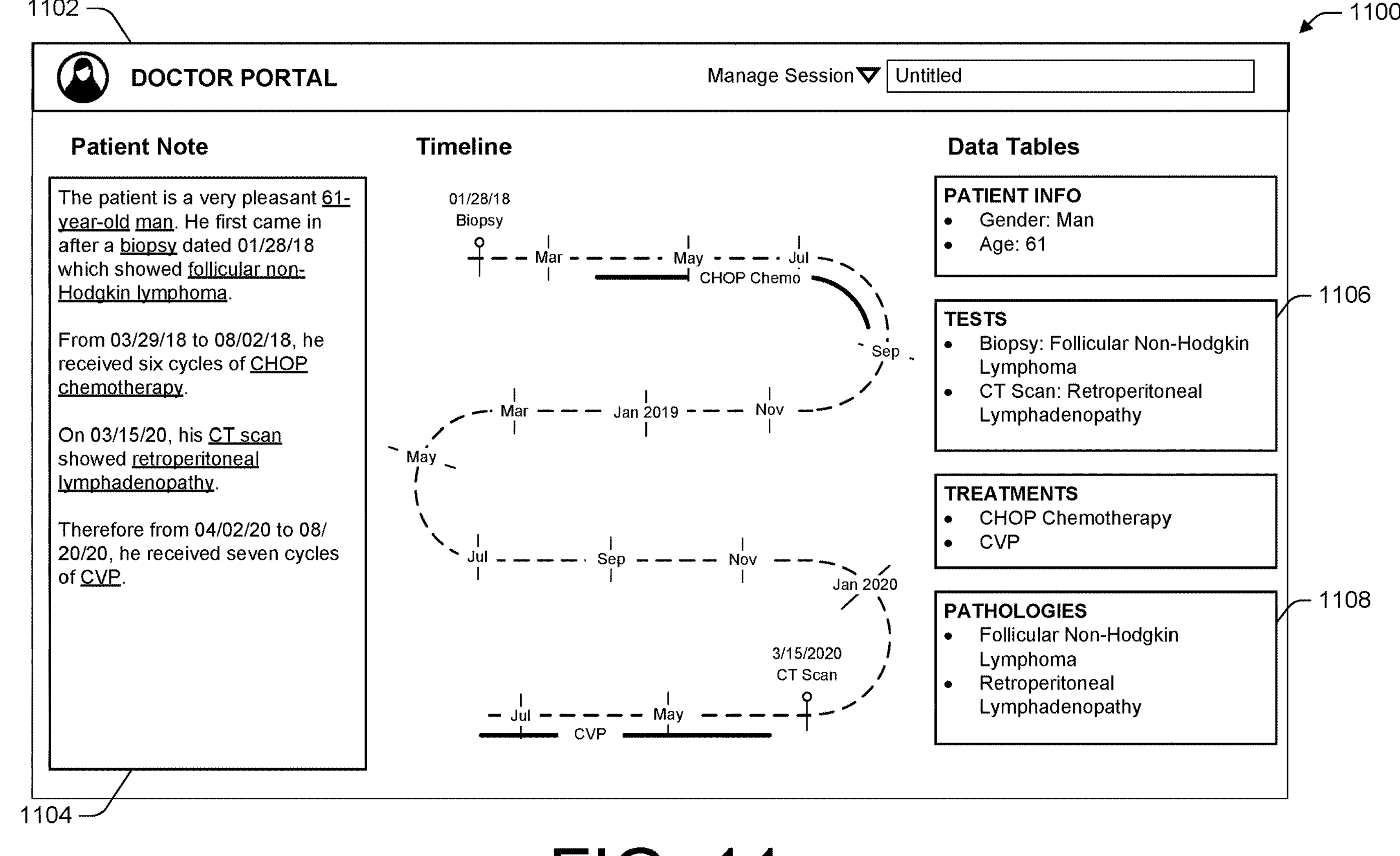
FIG. 11 illustrates an example user interface for a user portal in the medical domain using the collaborative user support system, as discussed herein

FIG. 11 illustrates an example user interface 1100 for a user portal in the healthcare domain using the collaborative user support system 206, as discussed herein. In some instances, the example user interface 1100 may present an example doctor portal 1102, including example user interface (UI) elements 1104, 1106, and 1108.

The user portal 208 may generate the example doctor portal 1102 to update the patient information following an edit to the patient note following in the example illustrated in FIG. 10. As depicted, following the example in FIG. 10, as depicted by the example UI element 1104, in response to the user providing additional information, the multimodal dialog engine 216 may update the session model to reflect the change in previous structured text "He first came in after a biopsy dated Jan. 28, 2018," to include the biopsy test result, "which showed follicular non-Hodgkin lymphoma."

In response to the user 104 responding to an "advice" prompt by changing the scenario, the multimodal dialog engine 216 may update the session model to reflect the change. In response to changes to input scenario, the multimodal dialog engine 216 may update visual presentation of diagnostics data to align with the input scenario. The multimodal dialog engine 216 may interpret the changes and represent the changes in an updated session model. In an additional and/or alternative example, the multimodal dialog engine 216 may determine to update the medical data tables. For instance, the example UI element 1106 now includes "Biopsy: Follicular Non-Hodgkin Lymphoma" and the example UI element 1108 now includes "Follicular Non-Hodgkin Lymphoma."

Figure 14:
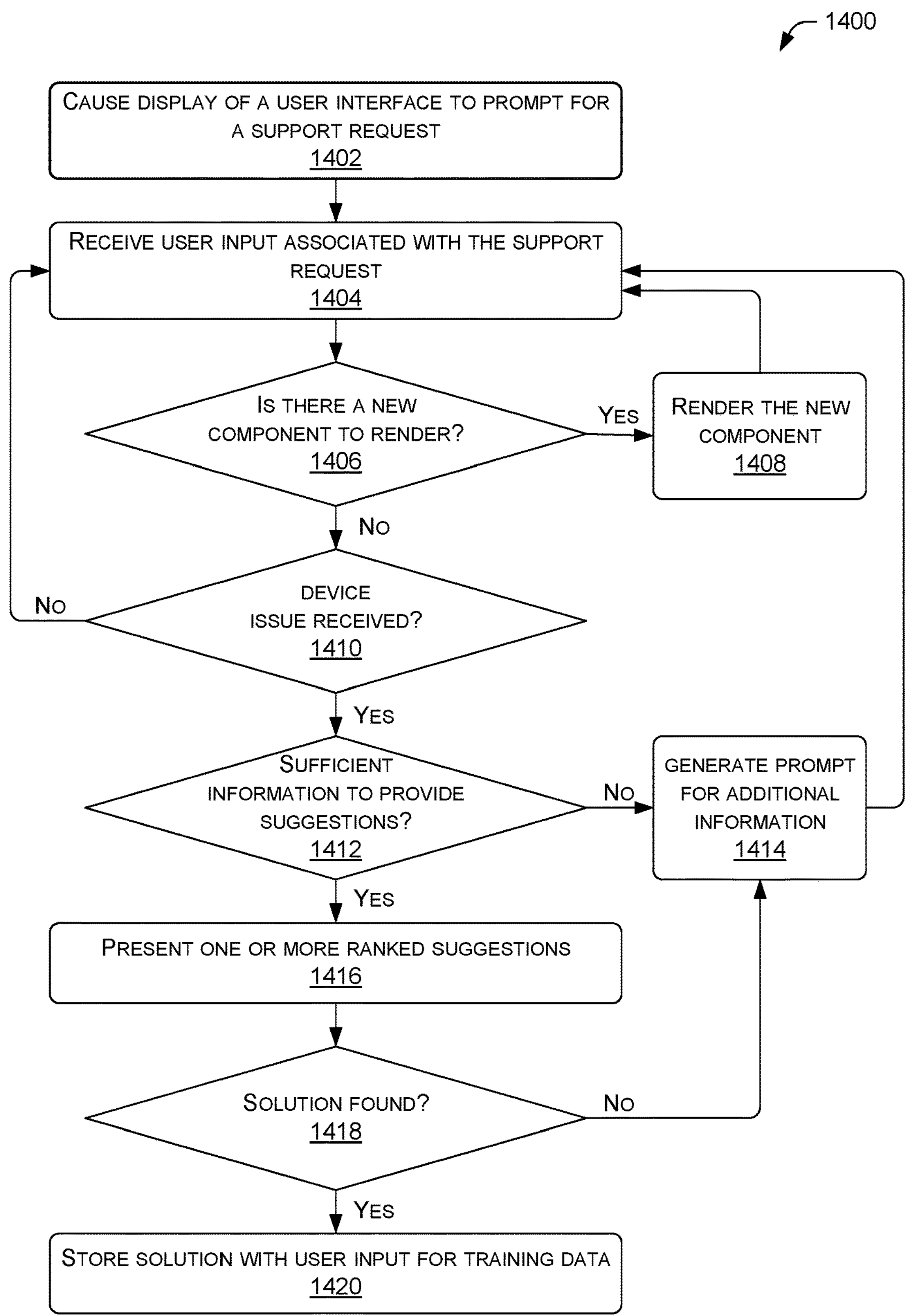
FIG. 14 illustrates example process for a user interface to iteratively receive user input, determine whether to render a component, if issue statement is received, and if there is sufficient information to provide suggestions using the collaborative user support system, as discussed herein.

FIGS. 12, 13, and 14 are flow diagrams of illustrative processes. The example processes are described in the context of the environment of FIG. 2 but are not limited to that environment. The processes are illustrated as a collection of blocks in a logical flow graph, which represents a sequence of operations that can be implemented in hardware, software, or a combination thereof. In the context of software, the blocks represent computer-executable instructions stored on one or more computer-readable media 204 that, when executed by one or more processors 202, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 12 illustrates an example process for a user interface to receive a support request in electronics domain using the collaborative user support system, as discussed herein. The process 1200 is described with reference to the system 100 and may be performed by one or more of the computing device(s) 102 and/or in cooperation with any one or more of the device(s) 106. Of course, the process 1200 (and other processes described herein) may be performed in other similar and/or different environments.

At operation 1202, the process may include causing display of a graphical user interface (GUI) to present a user portal to receive a support request for a device issue associated with a device configuration. For instance, the computing device(s) 102 or the device(s) 106 may cause display of a graphical user interface (GUI) to present a user portal to receive a support request for a device issue associated with a device configuration. The system may generate a user interface to guide user input to enter an input issue and explore the suggested remedies. As described herein, the system may generate a session model to store session data.

At operation 1204, the process may include receiving, via the GUI presented via the user device, second user input indicating a device issue associated with the device configuration. For instance, the computing device(s) 102 or the device(s) 106 may receive, via the GUI presented via the user device, second user input indicating a device issue associated with the device configuration. The system may receive user input describing a configuration and issues as natural language input. The system may present a multimodal presentation of the configuration and may include user interface (UI) elements to prompt the user to edit and/or refine the configuration. In a non-limiting example, the multimodal presentation may include a visual mapping or visual layout of a network diagram, a medical timeline, or a structured text. In some examples, the user portal may receive user input to invite a knowledge expert remotely into the model environment to start a live dialog session, discuss the session model and/or the configuration, and determine any remedial actions. The session model is updated with the new information acquired in this dialog session and persisted over time including historical information.

At operation 1206, the process may include determining, using a natural language understanding (NLU) engine, a structured representation of the first user input, wherein the structured representation includes the device configuration. For instance, the computing device(s) 102 or the device(s) 106 may determine, using a natural language understanding (NLU) engine, a structured representation of the first user input, wherein the structured representation includes the device configuration. In various examples, the semantic parser 214 may receive input scenario and may use a domain model to convert the natural language input into structured text. The semantic parser 214 may continuously parse a user input stream and generate structured text and the multimodal dialog engine 216 may generate visual representation for the structured text.

At operation 1208, the process may include causing, via the GUI presented via the user device, display of the diagnostic diagram to indicate the device issue. For instance, the computing device(s) 102 or the device(s) 106 may cause, via the GUI presented via the user device, display of the diagnostic diagram to indicate the device issue. The multimodal dialog engine 216 may determine a dialog to communicate to the user 104 based on a current session state. The multimodal dialog engine 216 may apply logical reasoning based on a current session state to generate dialogs to prompt, inform, guide, or query the user. In a non-limiting example, the multimodal dialog engine 216 may generate dialogs to include determining an explanation for a component in a diagram and/or for user interface (UI) elements, determining to ask a specific question for more information, proposing that the user take a particular action, asking a general question to formulate a problem and/or goal of the current session. In some examples, the multimodal dialog engine 216 may generate user interface elements to prompt the user to answer questions or respond to advice indicating information relevant to diagnosis is missing. For instance, the multimodal dialog engine 216 may determine the current components diagram indicates a generic electronic device and may prompt the user to enter a make or model of the electronic device. The multi modal dialog engine 216 may determine the dialog for display and use a natural language generation NLG to translate machine code to natural language dialog to present to the user. In response to the user answering a question or advice and/or changing a visual component, the multimodal dialog engine 216 may update the session model to reflect any changes. In response to changes with input scenario, the multimodal dialog engine 216 may update visual presentation of diagnostics data to align with the input scenario.

At operation 1210, the process may include determining, using one or more models, one or more suggestions for the device issue. For instance, the computing device(s) 102 or the device(s) 106 may determine, using one or more models, one or more suggestions for the device issue. The user portal 208 may present interface elements to prompt user input to formulate a problem and explore suggested solutions. The user portal 208 may include prompts for user input for device configuration details and device issues. The user portal 208 may include prompts to explore suggestions and/or linked relevant passages. In some examples, the user portal 208 may configure the user interface to guide the user input and take one or more remedial actions suggested. The remedial actions may be obtained from technical documents from specific manufactures or different bodies of domain knowledge base ("data sources" or "domain document corpora"), including natural language text journals, literature, documents, knowledge base, white paper, and/or structured knowledgebase).

At operation 1212, the process may include presenting, via the GUI presented via the user device, the one or more suggestions, wherein the one or more suggestions include one or more interactable links to technical documents. For instance, the computing device(s) 102 or the device(s) 106 may present, via the GUI presented via the user device, the one or more suggestions, wherein the one or more suggestions include one or more interactable links to technical documents. In some examples, the multimodal dialog engine 216 may configure user interface elements to guide the user input to explore suggested remedies and/or relevant articles found in a large body of knowledge ("data sources"), including natural language text (e.g., journals, literature, documents, knowledge base, market research documents, and/or structured databases). The multimodal dialog engine 216 may present the one or more suggestions with one or more interactable links to technical documents.

FIG. 13 illustrates an example process 1300 for a user interface to receive a support request using the collaborative user support system, as discussed herein. The process 1300 is described with reference to the system 100 and may be performed by one or more of the computing device(s) 102 and/or in cooperation with any one or more of the device(s) 106. Of course, the process 1300 (and other processes described herein) may be performed in other similar and/or different environments.

At operation 1302, the process may include causing display of a graphical user interface (GUI) to present a user portal to receive support request for an issue. For instance, the computing device(s) 102 or the device(s) 106 may cause display of a graphical user interface (GUI) to present a user portal to receive support request for an issue. In various examples, the user portal 208 may receive user input describing a configuration and issues as natural language input. The user portal 208 may present a multimodal presentation of the configuration and may include user interface (UI) elements to prompt the user to edit and/or refine the configuration. In a non-limiting example, the multimodal presentation may include a visual mapping or visual layout of a network diagram, a medical timeline, or a structured text.

At operation 1304, the process may include receiving, via the GUI presented via a user device, user input for the support request including an issue description. For instance, the computing device(s) 102 or the device(s) 106 may receive, via the GUI presented via a user device, user input for the support request including an issue description. The semantic parser 214 may receive natural language input and convert the natural language text into machine-readable structured representations. The natural language input may include user input, input scenario, and user issue description.

At operation 1306, the process may include determining, using a natural language understanding (NLU) engine on the user input, a structured representation of the issue description. For instance, the computing device(s) 102 or the device(s) 106 may determine, using the NLU engine on the user input, a structured representation of the issue description.

At operation 1308, the process may include causing, via the GUI presented via the user device, display of the structured representation that includes a visual representation of the issue description. For instance, the computing device(s) 102 or the device(s) 106 may cause, via the GUI presented via the user device, display of the structured representation that includes a visual representation of the issue description. The multimodal dialog engine 216 may determine to render a visual component ("graph") in response to receiving user input. The user input may include a continuous stream of words describing an input scenario that may be typed or spoken by the user 104. In some examples, the multimodal dialog engine 216 may use the semantic parser 214 to identify components and connections between the components as the user 104 continues to describe the input scenario and may draw or otherwise generate a visual representation of any components identified in the input scenario.

At operation 1310, the process may include determining, using one or more models, one or more suggestions based on the issue description. For instance, the computing device(s) 102 or the device(s) 106 may determine, using one or more models, one or more suggestions based on the issue description. In some examples, the multimodal dialog engine 216 may configure user interface elements to guide the user input to explore suggested remedies and/or relevant articles found in a large body of knowledge ("data sources"), including natural language text (e.g., journals, literature, documents, knowledge base, market research documents, and/or structured databases). The multimodal dialog engine 216 may present the one or more suggestions with one or more interactable links to technical documents.

At operation 1312, the process may include presenting, via the GUI presented via the user device, the one or more suggestions. In some examples, the multimodal dialog engine 216 may configure user interface elements to guide the user input to explore suggested remedies and/or relevant articles found in a large body of knowledge ("data sources"), including natural language text (e.g., journals, literature, documents, knowledge base, market research documents, and/or structured databases). The multimodal dialog engine 216 may present the one or more suggestions with one or more interactable links to technical documents.

FIG. 14 illustrates example process 1400 for a user interface to iteratively receive user input, determine whether to render a component, if issue statement is received, and if there is sufficient information to provide suggestions using the collaborative user support system, as discussed herein. The process 1400 is described with reference to the system 100 and may be performed by one or more of the computing device(s) 102 and/or in cooperation with any one or more of the device(s) 106. Of course, the process 1400 (and other processes described herein) may be performed in other similar and/or different environments.

At operation 1402, the process may include causing display of a user interface to prompt for a support request. The user portal 208 may generate a graphical user interface to collaborate with the user(s) 104. The user portal 208 may generate a graphical user interface to provide guidance and prompts to collaborate with the user(s) 104 to explore input scenario and remedies. In some examples, the graphical user interface may include prompts for user input to describe an issue associated with the support request.

At operation 1404, the process may include receiving user input associated with the support request. For instance, the computing device(s) 102 or the device(s) 106 may receive user input associated with the support request. The user portal 208 may present interface elements to prompt user input to formulate a problem and explore suggested solutions. The user portal 208 may include prompts for user input for device configuration details and device issues. The user portal 208 may include prompts to explore suggestions and/or linked relevant passages. In some examples, the user portal 208 may configure the user interface to guide the user input and take one or more remedial actions suggested.

At operation 1406, the process may include determining is there a new component to render. For instance, the computing device(s) 102 or the device(s) 106 may determine that is there a new component to render. If the computing device(s) 102 or the device(s) 106 determines yes, there is a component to render, and the operations may continue to operation 1408. If the computing device(s) 102 or the device(s) 106 determines no, there is not a component to render, and the operations may continue to operation 1410.

At operation 1408, the process may include rendering the new component. For instance, the computing device(s) 102 or the device(s) 106 may render the new component, and the operations may return to operation 1404.

At operation 1410, the process may include determining the device issue has been received. For instance, the computing device(s) 102 or the device(s) 106 may determine that the device issue has been received, and the operations may continue to operation 1412, otherwise, the operations return to operation 1404.

At operation 1412, the process may include determining if there is sufficient information to provide suggestions. For instance, the computing device(s) 102 or the device(s) 106 may determine that there is sufficient information to provide suggestions, and the operations may continue to operation 1416, otherwise, the operations return to operation 1414.

At operation 1414, the process may include generating prompt for additional information. For instance, the computing device(s) 102 or the device(s) 106 may generate prompt for additional information.

At operation 1416, the process may include presenting one or more ranked suggestions. For instance, the computing device(s) 102 or the device(s) 106 may present one or more ranked suggestions.

At operation 1418, the process may include determining if a solution is found. For instance, the computing device(s) 102 or the device(s) 106 may determine that a solution is found, and the operations may continue to operation 1420, otherwise, the operations return to operation 1414.

At operation 1420, the process may include storing solution with user input for training data. For instance, the computing device(s) 102 or the device(s) 106 may store solution with user input for training data.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor's) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, the software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

one or more processors; and memory storing computer-executable instructions that, when executed, cause the one or more processors to perform operations comprising:

causing display, via a user device, of a graphical user interface (GUI) to present a user portal to receive a support request for a device issue associated with a device configuration;

receiving, via the GUI presented via the user device, a first user input for the support request, wherein the first user input includes user data associated with a user account of a user and device description data that includes a first natural language input describing the device configuration, wherein the device configuration identifies multiple device components and the device issue causes a device system that includes the device configuration to be non-functional;

authenticating the user using the user data;

processing, as the first user input is being received via the GUI and using a semantic parser of a natural language understanding (NLU) engine, the first natural language input to generate a structured representation of the first user input, wherein the structured representation is a translation of text of the first natural language input to machine-readable code that is utilized by one or more computing devices to identify the device issue, the device configuration, and the multiple device components;

processing, as the first user input is being received via the GUI and using the semantic parser of the NLU engine, the first natural language input to identify first keywords that identify the multiple device components and that represent connections between the multiple device components within the device configuration;

retrieving, based at least in part on the first keywords, one or more rules of a plurality of rules maintained in a rule knowledge base maintained by a server device;

generating a diagnostic diagram associated with the structured representation using the one or more rules;

causing, at a first time and based at least in part on the first keywords and via the GUI presented via the user device, display of the diagnostic diagram, wherein the diagnostic diagram includes a visual representation of the multiple device components, the visual representation identifies the connections between the multiple device components, and the device issue is absent from the visual representation, wherein device components of the multiple device components and at least one connection between the device components are displayed within the diagnostic diagram presented via the GUI in real-time as the first user input is being received and prior to an entirety of the first user input being received;

receiving, via the GUI presented via the user device, second user input, wherein the second user input includes device issue description data that includes a second natural language input identifying the device issue associated with the device configuration;

processing, as the second user input is being received via the GUI and using the semantic parser of the NLU engine, the second natural language input to identify second keywords that identify the device issue;

automatically updating, at a second time subsequent to the first time, without receiving further input from the user, based at least in part on the second keywords, and using the one or more rules, the GUI presented via the user device to visually depict the device issue within the visual representation of the diagnostic diagram, wherein the device issue identifies at least one of a device component of the multiple device components or a connection of the connections that is causing the device system to be non-functional;

determine, using one or more models, one or more suggestions to resolve the device issue and to cause the device system to be functional; and automatically updating, without receiving the further input from the user, the visual representation of the diagnostic diagram presented via the GUI presented via the user device to visually depict the one or more suggestions, wherein the one or more suggestions include one or more interactable links to one or more technical documents that are associated with resolving the device issue.

2. The system of claim 1, wherein the one or more models include a domain model associated with electronic devices domain, and wherein the domain model includes knowledge representations of concepts, one or more relationships between the concepts, and causal rules associated with the electronic devices domain, and wherein the electronic devices domain is associated with a specific domain knowledge.

3. The system of claim 1, wherein the operations further comprise:

receiving, via the GUI presented via the user device, a selection of a first solution of the one or more suggestions;

receiving an affirmative feedback that indicates that the first solution resolved the device issue; and storing, as the user data and for training data, the device configuration, the device issue, the first solution, and the affirmative feedback.

4. The system of claim 1, wherein the operations further comprise:

determining that the one or more suggestions fail to resolve the device issue;

generating a prompt to request additional information associated with the device configuration; and presenting, via the GUI presented via the user device, the prompt to request the additional information, wherein the prompt includes a visual prompt to change the visual representation of the multiple device components.

5. The system of claim 1, wherein the visual representation of the multiple device components includes visually indicating a device component of the multiple device components as a graph node and a second connection between the multiple device components as a graph link.

6. The system of claim 1, wherein determining the one or more suggestions further comprises:

determining, by one or more machine learning models, confidence scores for the one or more technical documents associated with individual suggestions of the one or more suggestions, wherein the one or more machine learning models determine the confidence scores based at least in part on a probability of the one or more technical documents being classified as relevant to the device issue; and determining to present the one or more suggestions in a ranked order based at least in part on the confidence scores.

7. The system of claim 6, wherein the ranked order is further based at least in part on determining that the user data indicates a previous history associated with the device configuration and a make or model of a device component of the multiple device components.

8. A computer-implemented method comprising:

causing display, via a user device, of a graphical user interface (GUI) to receive a support request for an issue;

receiving, via the GUI presented via the user device, a user input for the support request, wherein the user input includes user data associated with a user account of a user and issue description data that includes a natural language input describing an issue description of the issue;

authenticating the user using the user data;

processing, as the user input is being received via the GUI and using a semantic parser of a natural language understanding (NLU) engine, the natural language input to generate a structured representation of the issue description, wherein the structured representation is machine-readable code that is utilized by one or more computing devices to identify the issue;

processing, as the user input is being received via the GUI and using the semantic parser of the NLU engine, keywords that identify the issue description;

retrieving, based at least in part on the keywords, one or more rules of a plurality of rules maintained in a rule knowledge base maintained by a server device;

generating a diagnostic diagram associated with the structured representation using the one or more rules;

automatically updating, without receiving further input from the user and based at least in part on the keywords, the GUI presented via the user device to display the diagnostic diagram associated with a structured representation that includes a visual representation of the issue description and one or more connections or relations between components within the issue description, wherein the components and at least one connection or relation between the components are displayed within the diagnostic diagram presented via the GUI in real-time as the user input is being received and prior to an entirety of the user input being received;

determining, using one or more models, one or more suggestions to resolve the issue based at least in part on the issue description; and automatically updating, without receiving the further input from the user, the GUI presented via the user device to visually depict the one or more suggestions.

9. The computer-implemented method of claim 8, further comprising:

determining that the one or more suggestions fail to resolve the issue; and causing, via the GUI presented via the user device, display of prompts to iteratively guide additional user input to add additional information for the support request.

10. The computer-implemented method of claim 8, further comprising:

receiving, via the GUI presented via the user device, a request to store session data associated with the support request;

storing the session data in association with the user account, the session data including the structured representation and the one or more suggestions;

receiving, via the GUI presented via the user device, a second support request for a second issue; and presenting, via the GUI presented via the user device, prompts to use a portion of the session data with the second support request.

11. The computer-implemented method of claim 8, further comprising:

receiving user feedback for a suggestion of the one or more suggestions, wherein the user feedback indicates a positive association or a negative association of one or more evidence passages supporting the suggestion;

storing the suggestion in association with the one or more evidence passages associated with the user feedback for training data; and generating, using the training data, one or more second models.

12. The computer-implemented method of claim 8, wherein the issue is a device configuration issue, the issue description describes a network diagram including one or more devices and the one or more models include a domain model associated with an electronic devices domain, and further comprising:

causing, via the GUI presented via the user device, display of the visual representation of the issue description, the visual representation indicating the one or more devices as nodes of a graph, and connections between the one or more devices as edges of the graph;

receiving, via the GUI presented via the user device, a request to change a first device of the one or more devices to a second device;

causing, via the GUI presented via the user device, display of a second visual representation of an updated issue description including the second device; and determining, using the one or more models, one or more second suggestions based at least in part on the updated issue description.

13. The computer-implemented method of claim 8, wherein the issue is an ongoing medical issue, and the one or more models include a domain model associated with a medical domain, and further comprising:

causing, via the GUI presented via the user device, display of the visual representation of the ongoing medical issue with the issue description, the ongoing medical issue visually indicating remedial actions as nodes, and a timeline between treatments as links.

14. The computer-implemented method of claim 13, further comprising:

receiving, via the GUI presented via the user device, a request to contact a medical health professional;

transmitting the request to contact the medical health professional; and causing, via a second GUI presented via a second user device associated with the medical health professional, display of the visual representation of the ongoing medical issue with the issue description.

15. One or more non-transitory computer-readable media storing computer executable instructions that, when executed, cause one or more processors to perform operations comprising:

causing display, via a user device, of a graphical user interface (GUI) to receive a support request for an issue;

receiving, via the GUI presented via the user device, a user input for the support request, wherein the user input includes user data associated with a user account of a user and issue description data that includes a natural language input describing an issue description of the issue;

authenticating the user using the user data;

processing, as the user input is being received and using a semantic parser of a natural language understanding (NLU) engine, the natural language input to generate a structured representation of the issue description, wherein the structured representation is machine-readable code that is utilized by one or more computing devices to identify the issue;

processing, as the user input is being received via the GUI and using the semantic parser of the NLU engine, keywords that identify the issue description;

retrieving, based at least in part on the keywords, one or more rules of a plurality of rules maintained in a rule knowledge base maintained by a server device;

generating a diagnostic diagram associated with the structured representation using the one or more rules;

automatically updating, without receiving further input from the user and based at least in part on the keywords, the GUI presented via the user device to display the diagnostic diagram associated with the structured representation that includes a visual representation of the issue description, wherein components associated with the issue description and at least one connection or relation between the components are displayed within the diagnostic diagram presented via the GUI in real-time as the user input is being received and prior to an entirety of the user input being received;

determining, using one or more models, one or more suggestions to resolve the issue based at least in part on the issue description; and automatically updating, without receiving the further input from the user, the GUI presented via the user device to visually depict a prompt for additional information based at least in part on the one or more suggestions.

16. The one or more non-transitory computer-readable media of claim 15, wherein the structured representation includes an issue question and a context associated with the issue question.

17. The one or more non-transitory computer-readable media of claim 16, the operations further comprising:

determining that the one or more models have been unable to identify a solution for the issue question; and determining to prompt input for second additional information to aid in resolving the issue question.

18. The one or more non-transitory computer-readable media of claim 15, wherein the issue is a device configuration issue and determining the one or more suggestions comprises:

determining, from the user input, one or more devices associated with the device configuration issue; and determining one or more evidence passages identifying the one or more devices.

19. The one or more non-transitory computer-readable media of claim 18, the operations further comprising:

receiving user feedback associated with the one or more evidence passages, wherein a positive feedback indicates a relevant evidence passage, and a negative feedback indicates an irrelevant evidence passage; and training one or more second models using the user feedback.

20. The system of claim 1, wherein the operations further comprise:

after receiving the first user input, generating a prompt for additional information relating to the diagnostic diagram;

causing display of the prompt via the GUI presented via the user device;

receiving, from the user device and responsive to the prompt, the additional information; and automatically updating, as the additional information is being received, the diagnostic diagram to visually illustrate the additional information.

* * * * *